US011315196B1

(12) United States Patent
Narayan et al.

(10) Patent No.: US 11,315,196 B1
(45) Date of Patent: Apr. 26, 2022

(54) SYNTHESIZED INVALID INSURANCE CLAIMS FOR TRAINING AN ARTIFICIAL INTELLIGENCE / MACHINE LEARNING MODEL

(71) Applicant: Data-Core Systems, Inc., Philadelphia, PA (US)

(72) Inventors: Anshuman Narayan, Bristol, PA (US); Jishnu Bhattacharyya, Philadelphia, PA (US); Sin-Min Chang, Fairfield, CT (US); Rathi Dasgupta, Philadelphia, PA (US); Pradeep K. Banerjee, Philadelphia, PA (US)

(73) Assignee: Data-Core Systems, Inc., Philadelphia, PA (US)

( * ) Notice: Subject to any disclaimer, the term of this patent is extended or adjusted under 35 U.S.C. 154(b) by 0 days.

(21) Appl. No.: 17/147,054

(22) Filed: Jan. 12, 2021

Related U.S. Application Data

(63) Continuation of application No. 17/111,123, filed on Dec. 3, 2020.
(Continued)

(51) Int. Cl.
*G06Q 40/00* (2012.01)
*G06Q 40/08* (2012.01)
(Continued)

(52) U.S. Cl.
CPC .......... *G06Q 40/08* (2013.01); *G06K 9/6227* (2013.01); *G06K 9/6265* (2013.01); *G06N 3/08* (2013.01); *G06N 5/045* (2013.01); *G06Q 10/10* (2013.01)

(58) Field of Classification Search
USPC ............... 705/4, 5, 39, 37, 38, 40; 719/328; 717/108; 715/704; 709/227, 217, 218;
(Continued)

(56) References Cited

U.S. PATENT DOCUMENTS

| 8,190,453 | B2 * | 5/2012 | Rowe, III | G06Q 10/10 |
| | | | | 705/2 |
| 8,438,047 | B2 * | 5/2013 | Curtin | G06Q 40/08 |
| | | | | 705/4 |

(Continued)

OTHER PUBLICATIONS

Tracing with Less Data: Active Learning for Classification-Based Traceability Link Recovery; 2019 IEEE International Conference on Software Maintenance and Evolution (ICSME) (pp. 103-113); Chris Mills, Javier Escobar-Avila, Aditya Bhattacharya, Grigoriy Kondyukov, Shayok Chakraborty, Sep. 1, 2019. (Year: 2019).*

*Primary Examiner* — Tien C Nguyen
(74) *Attorney, Agent, or Firm* — Akerman LLP

(57) ABSTRACT

Disclosed embodiments include generating invalid insurance claims based on category pairs from a category matrix derived from a set of known valid insurance claims, wherein an individual invalid insurance claim comprises at least one of: (i) a diagnosis code from a first category of a category pair and a procedure code from a second category of the category pair not in the first category or (ii) a procedure code from the first category of the category pair and a diagnosis code from the second category of the category pair not in the first category. Some embodiments also include generating a training dataset comprising (i) valid insurance claims from the set of known valid insurance claims and (ii) the invalid insurance claims; and using the training dataset to train an Artificial Intelligence/Machine Learning Engine to classify insurance claims as valid or invalid.

20 Claims, 13 Drawing Sheets

Exemplary System Overview Diagram

Related U.S. Application Data

(60) Provisional application No. 62/943,217, filed on Dec. 3, 2019.

(51) Int. Cl.
*G06K 9/62* (2022.01)
*G06Q 10/10* (2012.01)
*G06N 3/08* (2006.01)
*G06N 5/04* (2006.01)

(58) Field of Classification Search
USPC ......... 726/9, 6; 700/245, 236; 235/375, 380, 235/383
See application file for complete search history.

(56) References Cited

U.S. PATENT DOCUMENTS

| | | | | |
|---|---|---|---|---|
| 8,615,409 B1* | 12/2013 | McKown | ............... | G06Q 20/14 705/37 |
| 2012/0143634 A1* | 6/2012 | Beyda | ................... | G06Q 40/08 705/4 |
| 2013/0212432 A1* | 8/2013 | Guthrie | ................... | H04L 67/02 714/48 |
| 2013/0226623 A1* | 8/2013 | Diana | .................... | G06Q 40/08 705/4 |
| 2014/0149144 A1* | 5/2014 | Li | ......................... | G06Q 10/10 705/4 |
| 2014/0278585 A1* | 9/2014 | Zerbib | ................... | G06Q 40/08 705/4 |
| 2015/0032482 A1* | 1/2015 | Harmon | ................ | G06Q 40/08 705/4 |
| 2015/0088557 A1* | 3/2015 | Huynh | .................. | G06Q 10/10 705/4 |
| 2019/0095521 A1* | 3/2019 | Milleron | ............... | G06F 16/313 |
| 2019/0147371 A1* | 5/2019 | Deo | ....................... | G06N 20/20 706/12 |

\* cited by examiner

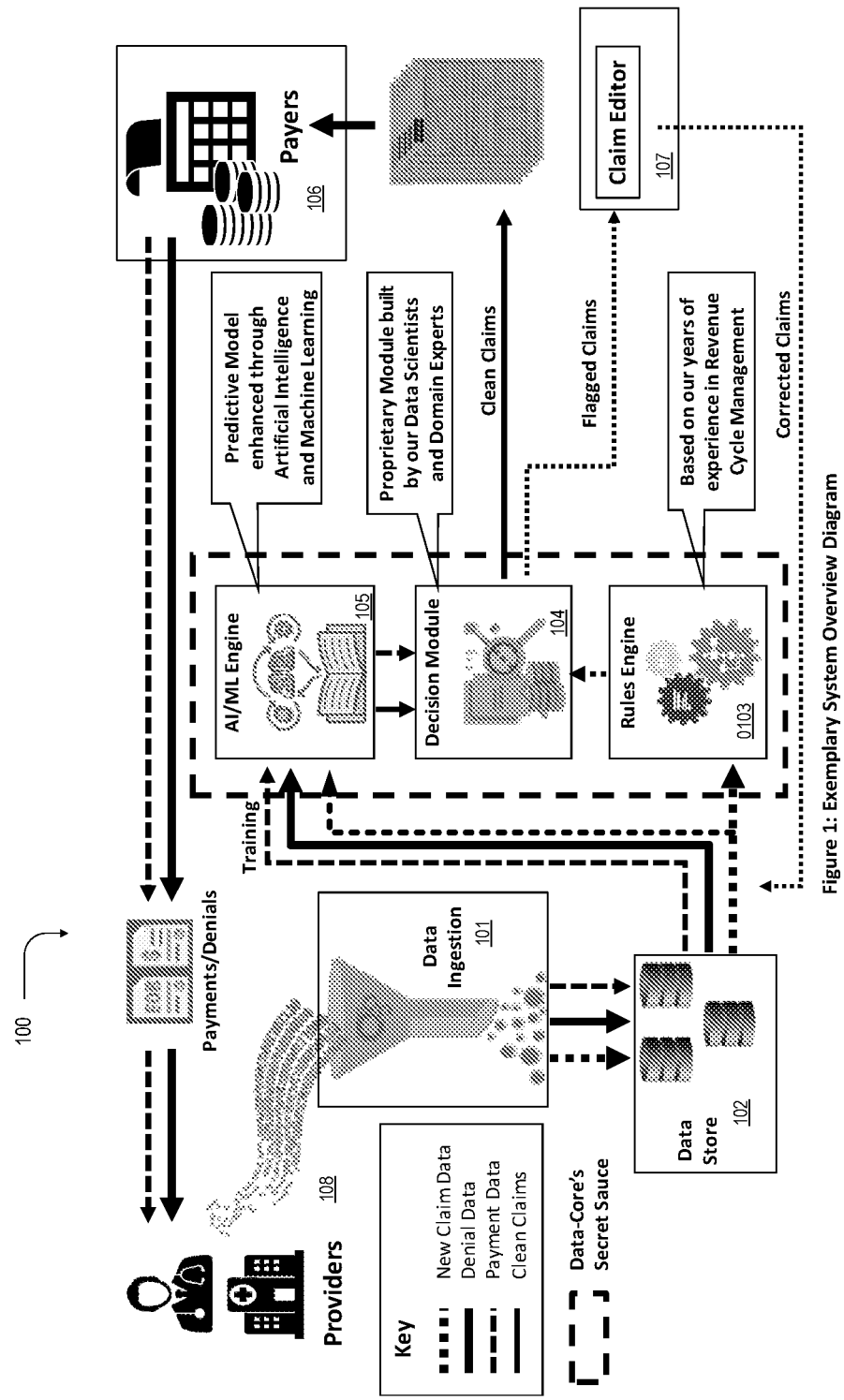

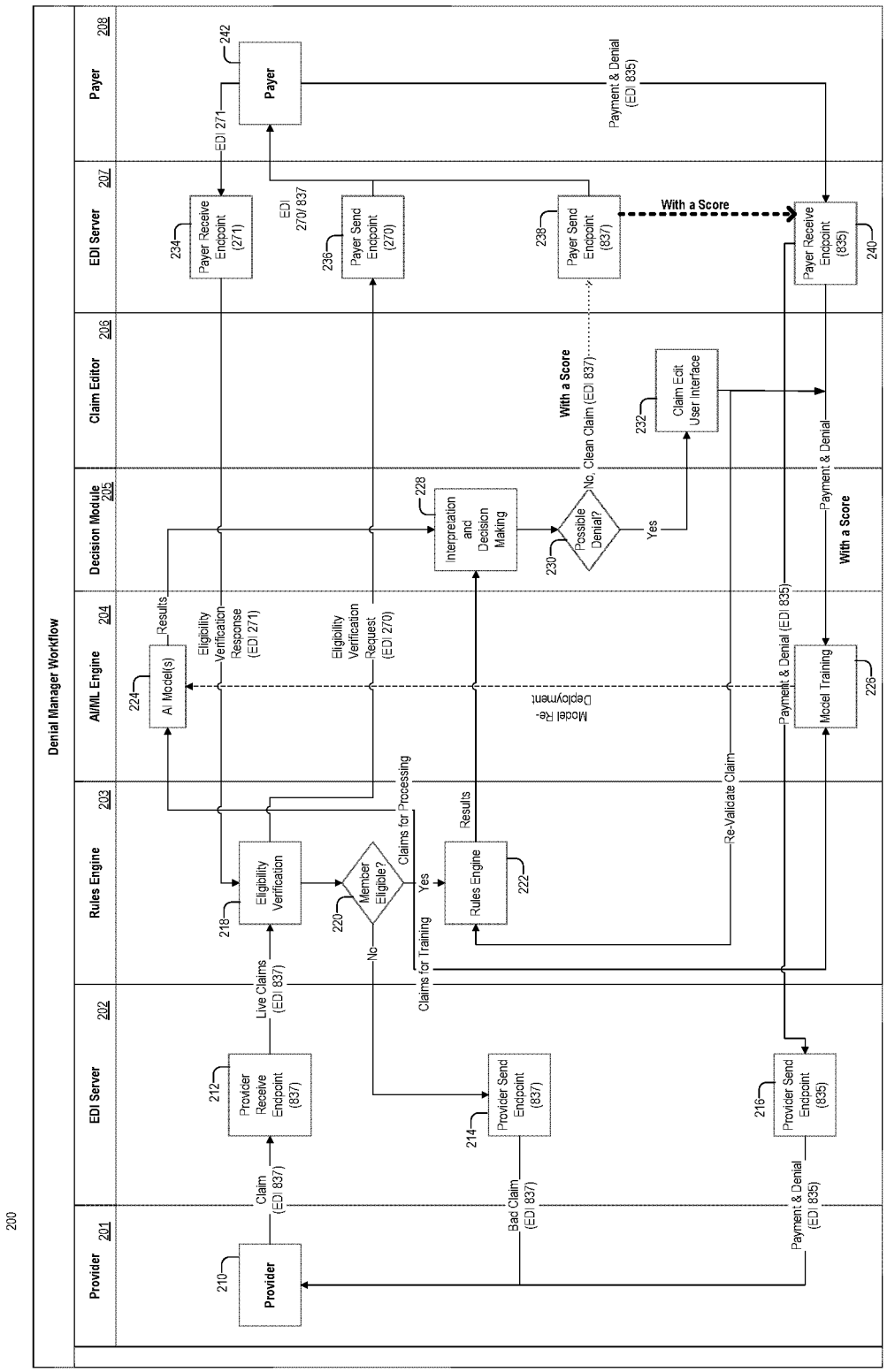
Figure 2: Exemplary System Workflow Diagram

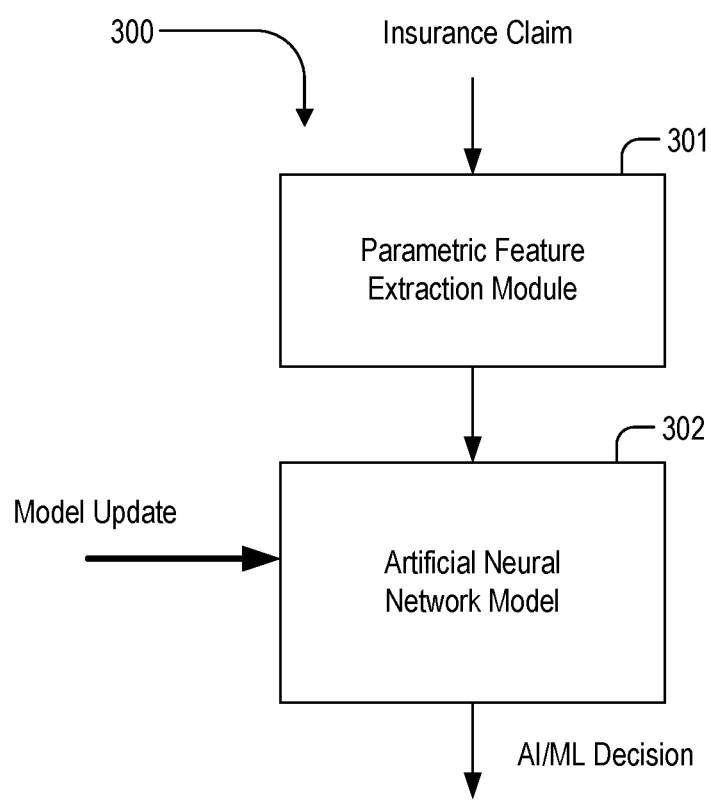
Figure 3A : Exemplary AI/ML Module Block Diagram

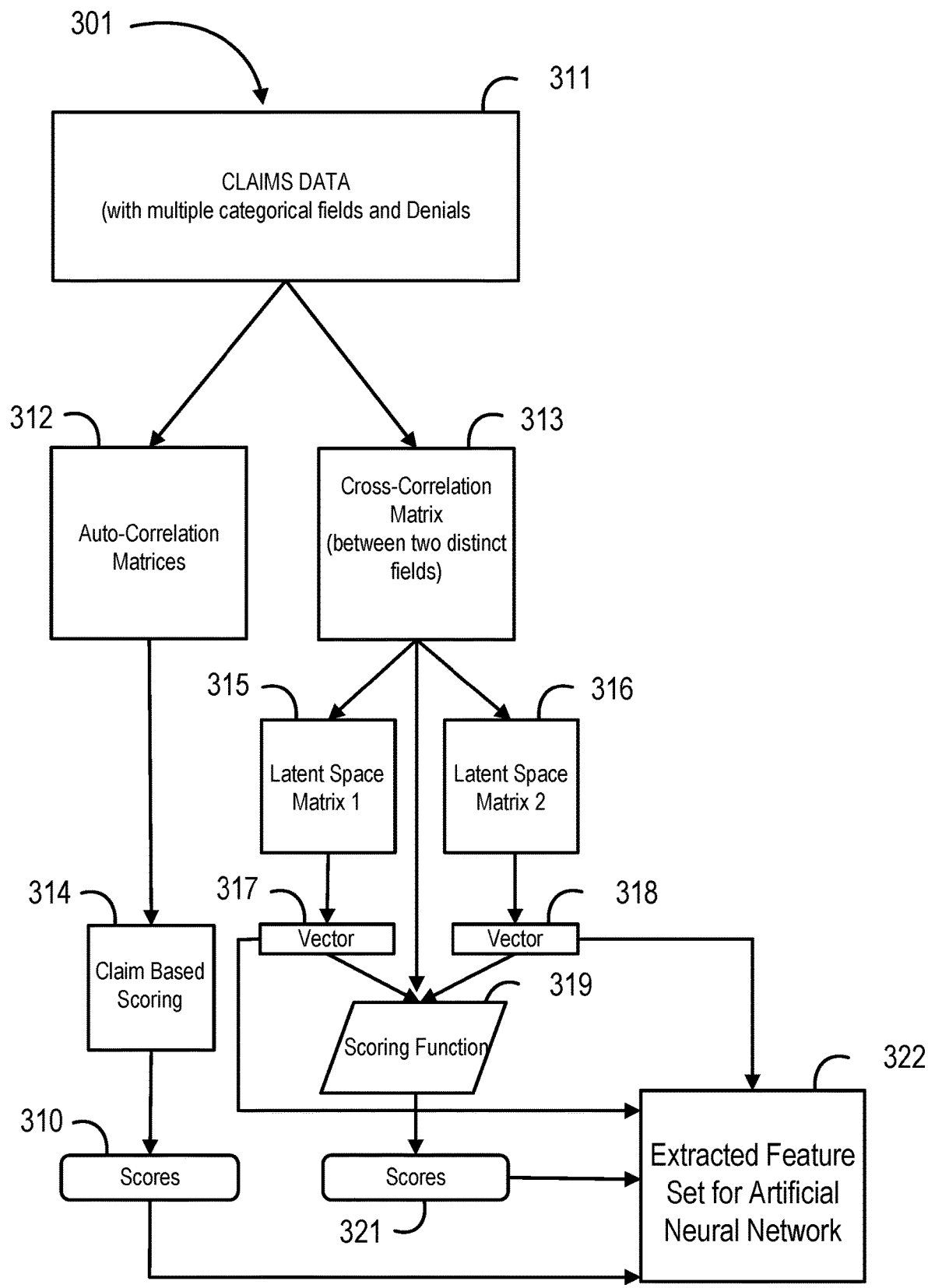
Figure 3B: Exemplary Parametric Feature Extraction Module

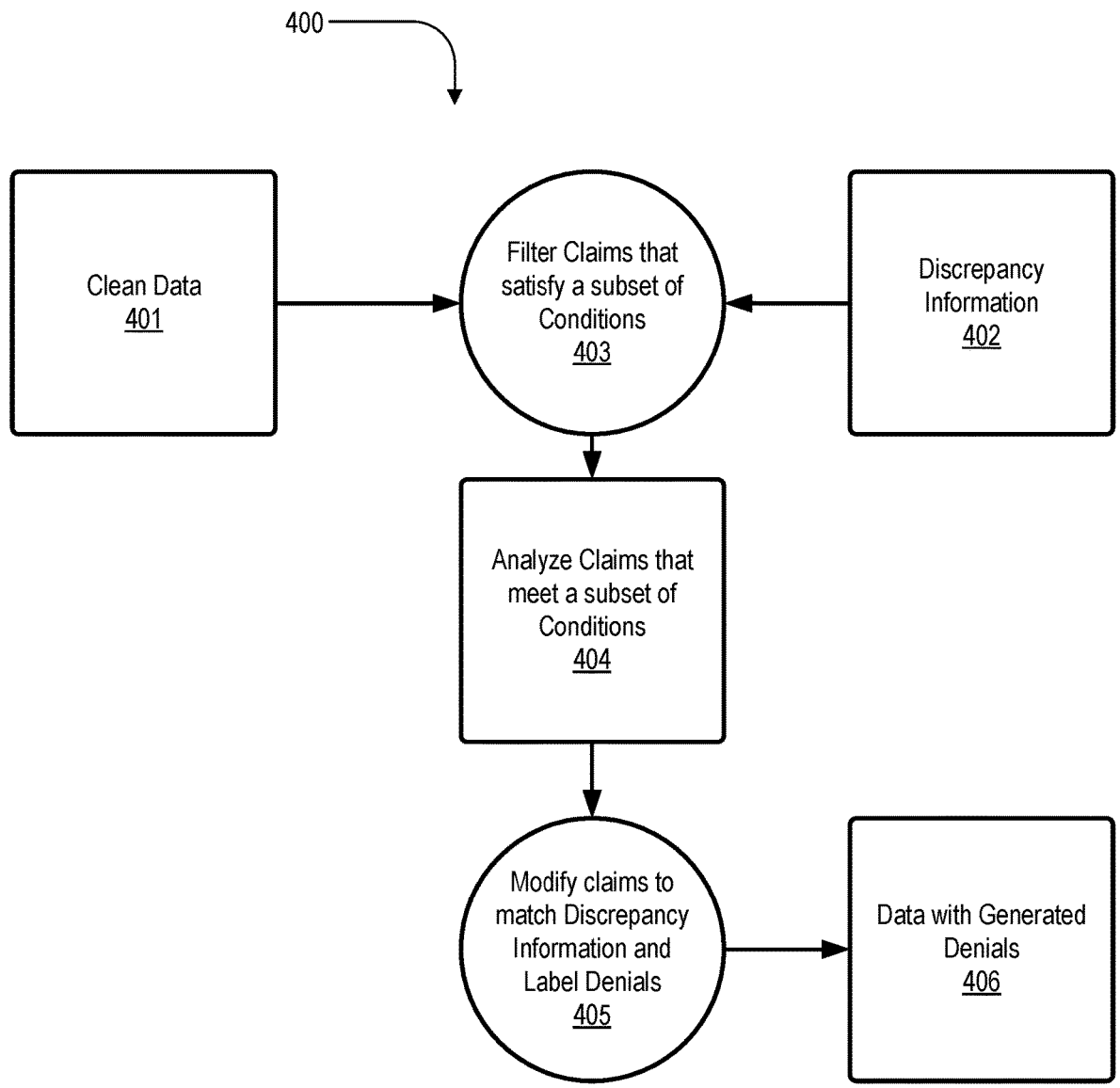
Figure 4: Exemplary Fault Injection Flow Diagram

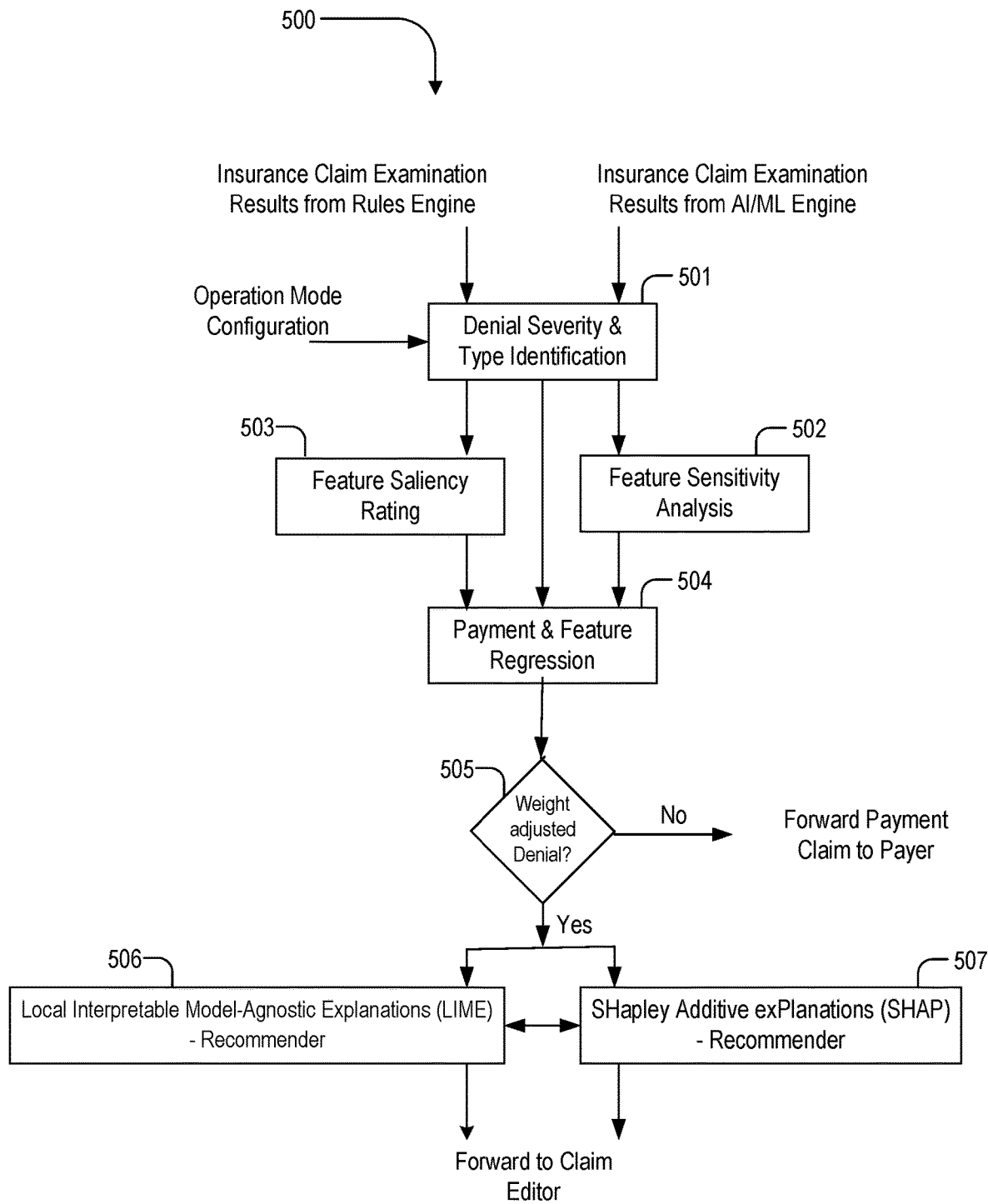
Figure 5A: Exemplary Decision Module Flow Diagram

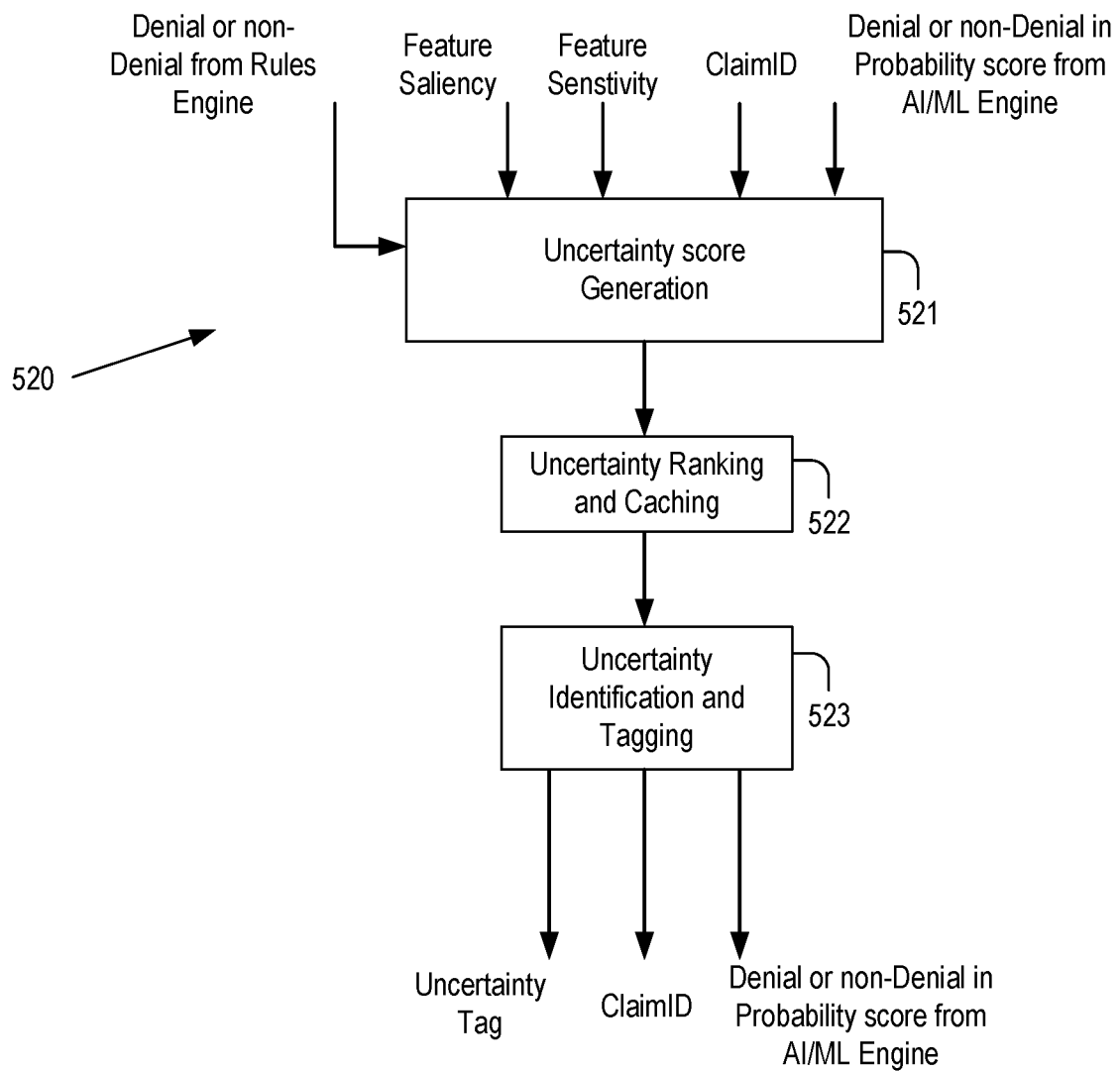
Figure 5B: Exemplary Uncertainty Tag Generation Flow Diagram

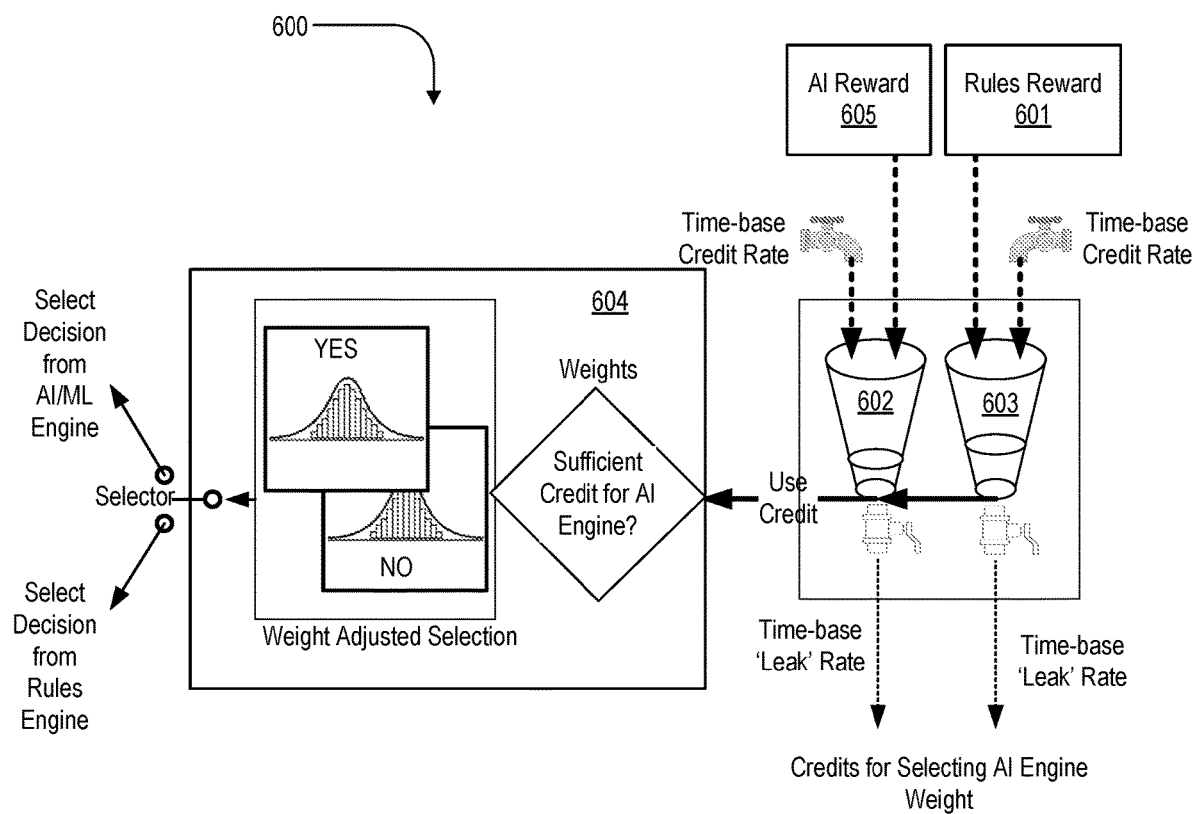
Figure 6. Example Credit Based Weight Selection

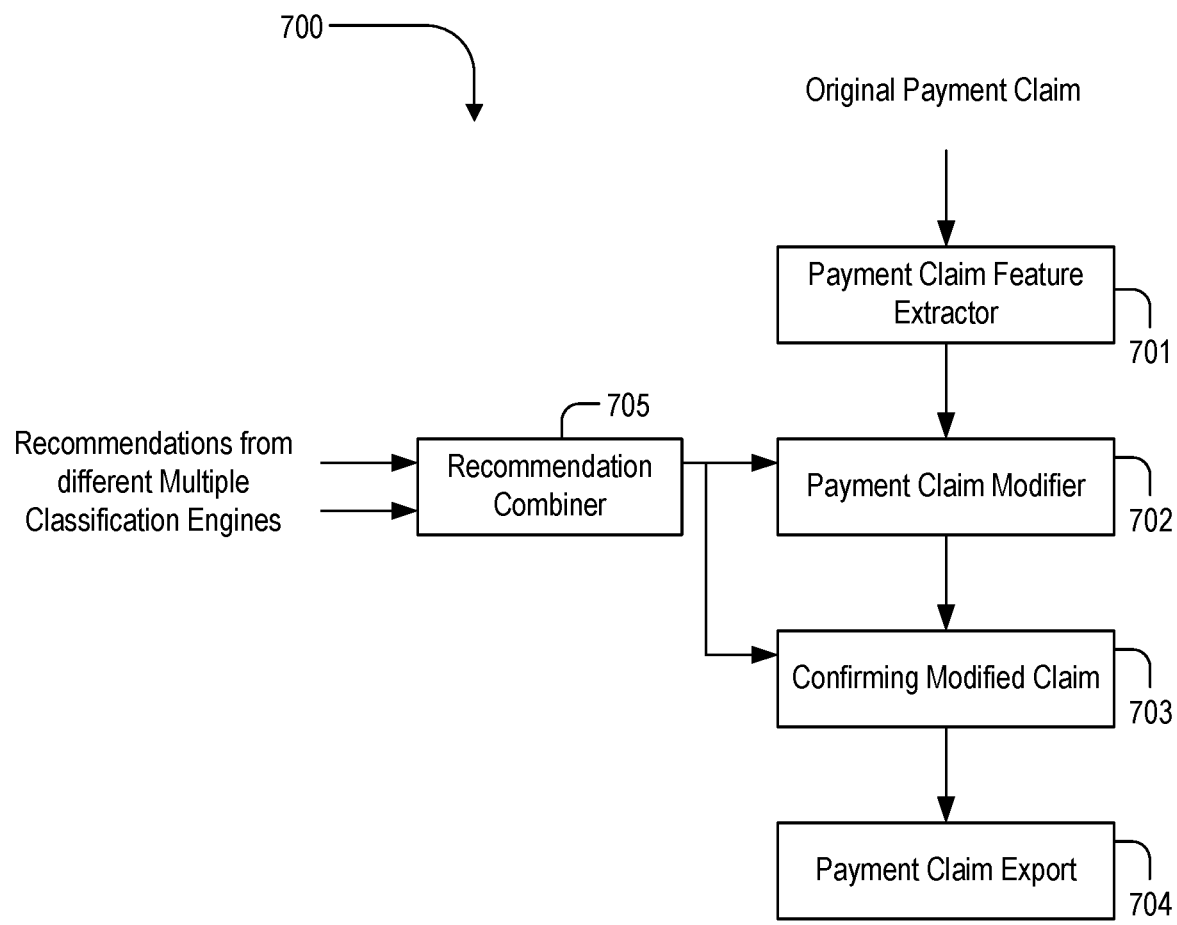
Figure 7: Exemplary Claim Editor Flow Diagram

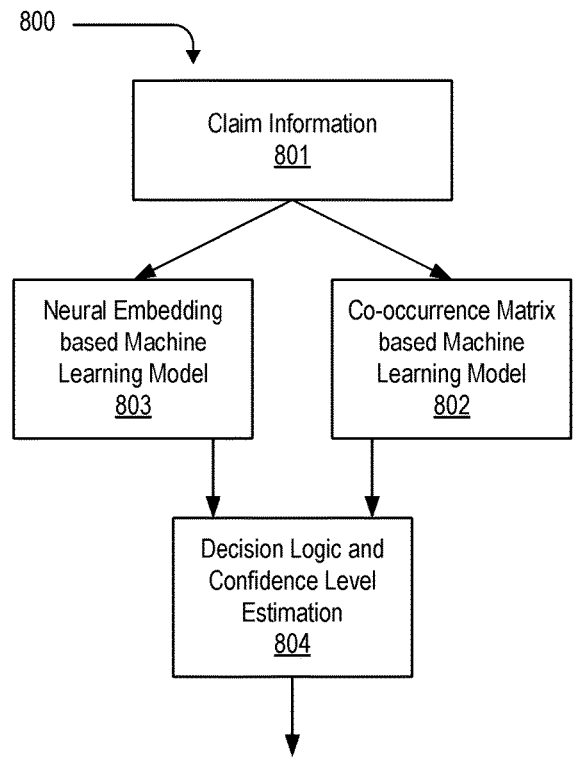
Figure 8A Combining Multiple Machine Learning Models
|  | | Co-occurrence Matrix based Machine Learning Model | | | |
|---|---|---|---|---|---|
|  | | 0-high-confident | 0-low-confident | 1-low-confident | 1-high-confident |
| Neural Embedding based Machine Learning Model | 0-high-confident | 0 | 0 | 0 | 0 |
| | 0-low-confident | 0 | 0 | 0 | 1 |
| | 1-low-confident | 0 | 0 | 1 | 1 |
| | 1-high-confident | 0 | 0 | 1 | 1 |
Figure 8B Exemplary Logic Map for Decision Logic in block 804

SYNTHESIZED INVALID INSURANCE CLAIMS FOR TRAINING AN ARTIFICIAL INTELLIGENCE / MACHINE LEARNING MODEL

CROSS-REFERENCE TO RELATED APPLICATIONS

The present application is a continuation of U.S. application Ser. No. 17/111,123 titled "Systems and methods for selecting a classification of input data from multiple classification systems," filed on Dec. 3, 2020 and currently pending. U.S. application Ser. No. 17/111,123 claims priority to provisional application 62/943,217 titled "Novel Medical Claim Inspection System Using Combined Rules and AI/ML Engine," filed on Dec. 3, 2019. The entire contents of application Ser. No. 17/111,123 and 62/943,217 are incorporated herein by reference.

OVERVIEW

The present application discloses and describes systems and methods for training and using multiple classification engines that operate in parallel to classify the same input data. In some example embodiments described herein, the input data comprises insurance claims and the multiple classification engines are configured to classify individual insurance claims as "acceptable for payment" (i.e., correct or valid) or "unacceptable for payment" (i.e., likely to be denied payment or incorrect/invalid). However, the systems and methods disclosed herein are equally applicable to other types of input data beyond insurance claims.

Some embodiments include selecting one classification output from two or more classification engines that are operating in parallel to classify input data items. In some embodiments, the selected classification is based on a weighted selection procedure that relies in part upon the past performance of the individual classification engines that are operating in parallel on the same input data items. Selecting one classification from multiple classification outputs based upon the past performance of individual classification engines has several technical advantages over prior art systems that rely upon a single classification engine.

For example, choosing one classification from among multiple classification outputs from multiple classification engines based in part on past performance of the individual classification engines can improve the performance of all the classification engines. In operation, operating multiple classification engines in parallel allows a system operator to identify (and improve) a lower-performing classification engine, and in turn, improve the operation of the system as a whole by allowing multiple classification engines to use the performance of one or more classification engines to help improve the performance of one or more other classification engines. Further, operating parallel classification engines allows a system operator to bring a new classification engine online with one or more existing (well-defined and/or well-trained) classification engine(s) and use the classification results of the existing classification engine(s) to help improve the performance of the new classification engine.

Some embodiments include using a well-defined data set to generate synthetic training data for use with training one or more machine learning classification systems. As mentioned above, in some embodiments, the one or more machine learning classification systems are configured to identify input data items as either "valid" or "invalid." One challenge with such classification engines is having sufficient high-quality training data to train the classification engine before putting the classification engine into operation. Embodiments disclosed herein are configured to analyze a well-defined data set to identify specific features of individual data items in the well-defined set that can be altered to generate synthetic data items that are very similar to individual data items but just different enough to make the synthetic data items "invalid." Intelligently generating synthetic "invalid" input data for training the classification engine helps the classification engine learn to discern fine distinctions between "valid" and "invalid" input data, thereby improving the performance of the classification engine.

Some embodiments include identifying potential anomalies in input data and recommending ways to correct the input data. For example, in a system comprising one or more classification engines configured to classify input data as "correct" (or valid) or "incorrect" (or invalid), it can be advantageous in some instances to identify one or more potential reasons why a certain input data item has been classified as "incorrect" (or invalid) so that the input data item can be corrected. In some embodiments, the input data comprises insurance claims and the one or more classification engines are configured to classify individual insurance claims as "acceptable for payment" (i.e., correct or valid) or "unacceptable for payment" (i.e., likely to be denied payment or incorrect/invalid). Some embodiments disclosed herein include identifying potential reasons why an individual insurance claim has been classified as unacceptable for payment. Identifying one or more potential reasons why an individual insurance claim has been classified as unacceptable for payment (sometimes referred to herein as "invalid") can help a human operator "fix" an insurance claim before submitting it to a payer for payment.

Additionally, identifying why an individual data item has been classified as "invalid" helps improve the overall operation of the system. For example, a human operator can consider the one or more reasons why the system has classified an individual data item is "invalid" to help determine whether to retrain a particular classification engine with a focus on particular features or feature sets that a classification engine may be consistently classifying incorrectly.

Some embodiments disclosed and described herein include classifying an insurance claim as (i) "valid"/"acceptable for payment" or (ii) "invalid"/"unacceptable for payment" (or similar classifications). A classification as "valid" or "acceptable for payment" means that a payer is likely to pay the claim whereas classification of "invalid" or "unacceptable for payment" means that a payer is likely to deny payment of the claim. Some embodiments also include correcting an insurance claim that has been classified as invalid. Some embodiments use multiple classification engines to classify insurance claims as valid or invalid. For example, some embodiments use a Rules Engine and an Artificial Intelligence/Machine Learning (AI/ML) Engine to classify individual insurance claims as valid or invalid before the individual insurance claims are submitted to a payer for payment.

Classifying insurance claims as valid or invalid before submission to a payer for payment enables individual claims that have been classified as invalid to be corrected/revised (and perhaps classified again) to increase the likelihood that the payer will pay the claim.

SUMMARY OF EXAMPLE EMBODIMENTS

The embodiments shown, disclosed, and described in the figures and specification are set forth only as examples. As such, those skilled in the art will appreciate that other arrangements and elements (e.g., machines, interfaces, functions, orders, and groupings of functions) can be used instead, and that some elements may be omitted altogether. Further, many of the elements shown and described herein are functional entities that may be implemented as discrete or distributed components or in conjunction with other components, and in any suitable combination and location. Various functions described herein as being performed by one or more entities may be carried out by hardware, firmware, and/or software (and any combination thereof). For example, one or more processors executing instructions stored in one or more tangible computer-readable memory components may implement one or more of the features and functions described herein.

Some embodiments comprise tangible, non-transitory computer readable media comprising instructions encoded thereon, where the instructions, when executed by one or more processors, cause one or more computing devices and/or systems to execute one or more methods comprising a series of one or more processes and/or sub-processes to perform the functions disclosed and/or described herein.

In some embodiments, the sub-processes (or perhaps functions thereof) may be performed successively (or serially), simultaneously (or in parallel), or intermittently with other sub-processes (or perhaps functions thereof). Further, it is envisioned that some of the steps and/or functions of the sub-processes may be changed, may be substituted for, may be combined with other steps and/or functions of other sub-processors, or may be eliminated. Further, it is envisioned that some sub-processes and other disclosed methods may include additional steps not explicitly shown or described herein. The methods, processes, and sub-processes described herein are merely exemplary and those skilled in the art will recognize modifications that fall within the scope and spirit of the inventions and embodiments thereof disclosed and described herein.

Some example embodiments described herein include five different Modules: (1) a Rules Engine configured to classify individual insurance claims as valid or invalid by applying a sophisticated set of rules (e.g., IF/THEN or similar rules) separate from an Artificial Intelligence (AI) or Machine Learning (ML) analysis; (2) an Artificial Intelligence/Machine Learning (AI/ML) Engine configured to classify individual insurance claims as valid or invalid by applying AI/ML based models; (3) a Decision Module configured to examine the classification result for an individual claim from both the Rules Engine and the AI/ML Engine to select one of the classifications as the classification for the individual claim; (4) a Claims Editor configured to correct insurance claims that have been classified as invalid; and (5) an EDI Server configured to facilitate EDI transactions between and among healthcare providers and insurance claim payers. In some embodiments, all five of the modules are implemented in a single computing system comprising one or more processors and tangible, non-transitory computer-readable media having instructions encoded therein, wherein the instructions, when executed by the one or more processors, cause the computing system to perform the functions of one or more (or all) of the five modules.

One novel aspect of the systems and methods disclosed herein includes classifying an individual insurance claim by both the Rules Engine and the Artificial Intelligence/Machine Learning (AI/ML) Engine, and using a Decision Module to interpret the classifications returned by the Rules Engine and the AI/ML Engine and to select one of the classifications (i.e., the classification returned by the Rules Engine or the classification returned by the AI/ML Engine) as the classification for the individual insurance claim. In operation, classification of insurance claims as valid or invalid can be based on pre-defined rules implemented by the Rules Engine and/or based on machine learning methods implemented by the AI/ML Engine which is able to capture more complex scenarios for determining whether a claim is valid (acceptable for payment) or invalid (likely to be denied for payment by a payer).

For example, the Rules Engine examines individual insurance claims for any violation of a set of rules based on pre-existing knowledge embodied in the rules implemented by the Rules Engine. The AI/ML Engine, on the other hand, compares each insurance claim with a model (e.g., an Artificial Neural Network (ANN)) trained on known accepted and denied insurance claims to determine whether a particular insurance claim provided as an input to the AI/ML Engine has features of insurance claims that have been accepted for payment (valid claims) or denied for payment (invalid). For an insurance claim related to a common medical condition, it is straightforward to find a prior insurance claim that matches "exactly" with the insurance claim under examination. In reality, however, there would be some deviation from an "exact" match. Moreover, there would be plenty of newly created insurance claims with Diagnosis Codes (for example International Classification of Diseases-Clinical Modification (ICD-10-CM) codes) and Procedures Codes (for example ICD Procedure Coding System (ICD-10-PCS), Current Procedure Terminology (CPT), Healthcare Common Procedure Coding System (HCPCS)) collections not yet "learned" by the model trained for the AI/ML Engine. Diagnosis Codes and Procedure Codes are sometimes referred to herein generally as "Medical Codes".

In operation, the AI/ML Engine evaluates the probability of denial of each insurance claim with a model trained to identify insurance claims as valid or invalid based on combinations of diagnosis and procedure codes contained within the insurance claim, perhaps in combination with other information in the insurance claim.

As mentioned earlier, the AI/ML Engine is trained using a training database comprising well-defined example insurance claims. The size and the dimension of the training database could be ultra-large (i.e., many claims) and ultra-high (i.e., where each claim has many different features, where features correspond to combinations of medical codes). Another novel aspect of the disclosed systems and methods includes using a "divide and conquer" approach to reduce the dimensionality of the training database while preserving the knowledge embedded in the training database.

One inventive aspect of the systems and methods disclosed herein includes the use of two or more Machine Learning models employing complementary characteristics. For example, co-occurrence matrix based embedding and Neural Network based embedding using different initialization techniques during training can result in different behavior characteristics of the AI/ML Engine. In operation, the training dataset is very likely to be deficient in comparison to all possible combinations of medical codes that might be generally required to train an AI model because of the paucity of available healthcare related datasets. To address this critical issue, the disclosure presents a method which takes advantage of the neural embedding, which has a better accuracy, combining with a co-occurrence matrix embedding of predictable initialization for unknown situations. This approach can reduce the size of the training dataset required to produce a predictable and reliable classification engine, which can also reduce the amount of time required to train the AI model.

The rules in the Rules Engine may not be able to accurately classify every insurance claim provided to the Rules Engine for classification because the potential combinations and permutations of diagnosis codes, procedure codes, and other information in individual insurance claims is extraordinarily large and, thus, the number of rules that would be required to correctly classify every insurance claim is extraordinarily large. Further, new rules added to the Rules Engine may lag behind receipt of insurance claims that could have been classified according to the new rules, or the new rules may conflict with older rules and/or new training data. In some cases, a classification returned by the Rules Engine may provide a cue to the AI/ML Engine results. Unlike a classification returned by the Rules Engine which can provide a reason for a particular classification (i.e., a violation of one or more specific rules), a classification returned by the AI/ML typically does not provide a reason for the classification. Some embodiments disclosed herein include a Decision Module configured to interpret the results from both the Rules Engine and the AI/ML Engine (and perhaps one or more additional classification engines) to generate a meaningful recommendation as to how to classify a particular insurance claim.

In operation, the Rules Engine can be updated when a new set of rules are available; likewise, the models used in the AI/ML Engine can be retrained using an updated set of training data. For example, the AI/ML Engine may need to be retrained when many individual claims being classified by the AI/ML Engine receive low-confident results that their values fall out of the proximity of 1 or 0, where a value near 0 returned by the AI/ML Engine suggests the insurance claim is invalid (i.e., likely to be denied payment by a payer) and a value near 1 returned by the AI/ML Engine suggests the insurance claim is valid (i.e., likely to be paid by a payer). However, a result of 0.5 represents uncertainty for a binary classification engine because it is not clear whether the insurance claim should be classified as invalid or valid. In operation, insurance claims receiving a low level of confidence or a high level of uncertainty should be validated and examined by a domain expert. In some embodiments, once such a claim has been validated by a domain expert, that claim can be added into the training dataset for future retraining of the AI/ML Engine.

Another novel aspect of the disclosed systems and methods includes particular techniques for generating training data. One of the technical challenges for training the AI/ML Engine arises from use of the Healthcare Cost and Utilization Project-Nationwide Inpatient Sample (HCUP-US NIS) and Nationwide Emergency Department Sample (HCUP-US NEDS) database of insurance claims. The HCUP-US NIS and HCUP-US NEDS (sometimes referred to herein simply as the "HCUP Dataset") includes examples of valid insurance claims, i.e., claims that would be approved for payment by a payer. While the HCUP Dataset is helpful to train an AI/ML Engine to identify valid claims, the HCUP Dataset is less helpful at training an AI/ML Engine to identify invalid claims. Therefore, some embodiments disclosed herein include generating synthesized invalid insurance claims that are then used to train the AI/ML Model to identify invalid insurance claims. These synthesized invalid insurance claims are then added to a training dataset for training the AI/ML Engine. Once the synthetic invalid insurance claims have been added to the training database, the training database includes the valid claims from the HCUP Dataset and the synthesized invalid claims generated by the procedures disclosed herein.

However, adding the synthesized invalid claims into the training database with the valid HCUP dataset creates a "class imbalance" in the training data. Therefore, to address the class imbalance, some embodiments disclosed herein include methods to "balance" the data in the training database after inducing the synthesized invalid claims.

BRIEF DESCRIPTION OF THE DRAWINGS

FIG. 1 shows an example computing system according to some embodiments.

FIG. 2 shows an example system workflow diagram according to some embodiments.

FIG. 3A shows is an exemplary block diagram for an AI/ML Module according to some embodiments.

FIG. 3B shows some aspects of the Parametric Feature Extraction Module shown in FIG. 3A.

FIG. 4 shows an example operational flow of a Fault Injection method to generate the synthesized denial data for training the AI/ML Engine according to some embodiments.

FIG. 5A shows a process implemented by a Decision Module according to some embodiments.

FIG. 5B shows a procedure to identify insurance claims having an uncertain classification result from the AI/ML Engine.

FIG. 6 shows a credit-based scoring procedure according to some embodiments.

FIG. 7 shows an example process 700 performed by claim editor according to some embodiments.

FIG. 8A shows a process for combining results from two machine learning models according to some embodiments.

FIG. 8B shows an example logic implementation of the Decision Logic according to some embodiments.

DETAILED DESCRIPTION OF THE DRAWINGS

Figure 9:
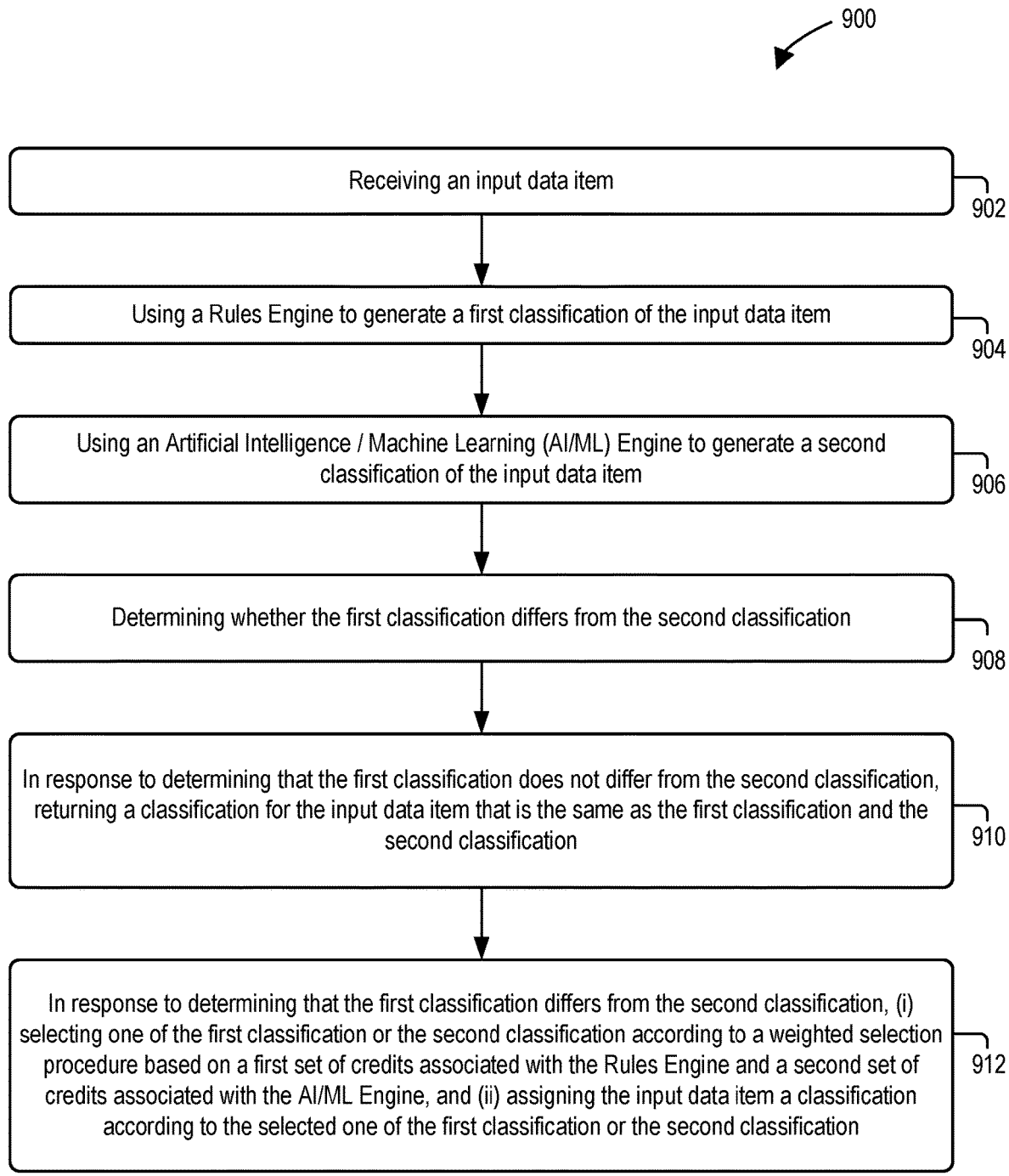
FIG. 9 shows an example method 900 of selecting a classification of input data from one of two classification systems according to some embodiments.

FIG. 1 shows an exemplary diagram of the architecture and the information flow of a computing system 100 according to some embodiments. FIG. 1 shows a high-level overview of how the system 100 receives insurance claims from providers 108 via a data ingestion process 101, and then stores the received insurance claims into data storage 102. In some embodiments, the data ingestion process 101 occurs via an EDI-837 interface from the provider 108.

The computing system 100 sends individual insurance claims from the data storage 102 to both the Rules Engine 103 and the Artificial Intelligence/Machine Learning (AI/ML) Engine 105 for classification. For each individual insurance claim, the system provides the classification result returned by the Rules Engine 103 and the classification result returned by the AI/ML Engine 105 to the Decision Module 105. In operation, the Decision Module 105 performs functions including identifying insurance claims having a high probability of denial so that such insurance claims can be (i) returned to the payment claim originator (e.g., one of the providers 108) or (ii) modified via a Claim Editor 107 the insurance claim is submitted to a payer 106.

In some embodiments, the computing system 100 can be selectively operated in one of four modes of operations, including (1) classifying individual claims with Rules Engine only, (2) classifying individual claims by the AI/ML Engine only, (3) classifying individual claims by the Rules Engine first followed by the AI/ML Engine if the Rules Engine determines the insurance valid (or at least does not violate any of the rules in the Rules Engine), or (4) classifying individual claims by the Rules Engine and the AI/ML Engine in parallel or substantially in parallel.

The Rules Engine 103 classifies an insurance claim as valid (likely to be accepted for payment by a payer) or invalid (likely to be denied for payment by a payer) by applying a set of rules (e.g., IF/THEN or similar rules) to the insurance claim to determine whether the insurance claim violates one or more rules applied by the Rules Engine 103. The AI/ML Engine 105 classifies an insurance claim as valid or invalid by using a model that captures complex scenarios for the acceptance or the denial of the insurance claim, such as whether and/or the extent to which the insurance claim includes one or more features (e.g., combinations of medical codes) consistent with prior insurance claims that are known to be valid (likely to be accepted for payment) or invalid (likely to be denied payment). After the computing system 100 has classified an individual insurance claim via one or both of the Rules Engine 103 and/or the AI/ML Engine 106, the computing system provides the classification(s) to the Decision Module 104.

The Decision Module 104 identifies insurance claims that have been classified by the Rules Engine 103 and/or the AI/ML Engine 105 as valid (likely to be accepted by a payer 106 for payment) and arranges for such claims to be forwarded to the appropriate Payer(s) 106 for payment. The Decision Module 104 also identifies insurance claims that have been classified by the Rules Engine 103 and/or the AI/ML Engine 105 as invalid (likely to be denied for payment by a payer). In some embodiments, for the insurance claims that have been classified as invalid, the Decision Module 104 determines whether an insurance claim should be one of: (1) returned to the payment originator (e.g., one of the providers 108); (2) modified either automatically or manually using the Claim Editor 107 before being forwarded to the Payer 106; or (3) forwarded to the payer 106 without any changes despite having been classified as likely to be denied for payment.

FIG. 2 shows an example system workflow diagram 200 according to some embodiments. Workflow diagram 200 shown in FIG. 2 may be implemented by computing system 100 shown in FIG. 1.

The workflow diagram 200 shows how insurance claims are routed from a provider 201 to a payer 208 through a system of computing components/functions including an provider-facing Electronic Data Interchange (EDI) Server Module 202, Rules Engine 203, AI/ML Engine 204, Decision Module 205, Claim Editor 206, and payer-facing EDI Server Module 207. In some embodiments the provider-facing EDI Server Module 202 and the payer-facing EDI Server Module 207 may be incorporated within a single EDI Server. In some embodiments, the provider-facing EDI Server Module 202 and the payer-facing EDI Server Module 207 may be the same EDI Server Module.

The provider-facing EDI Server Module 221 and payer-facing EDI Server Module 207 facilitate standard Health Insurance Portability and Accountability Act-Electronic Data Interchange (HIPAA-EDI) between a particular provider 210 and payer 242. A key component of the Health Insurance Portability and Accountability Act (HIPAA) of 1996 was the establishment of national standards for electronic health care transactions and national identifiers for providers, health insurance plans and employers. The computing system 100 implementing the workflow diagram 200 of FIG. 2 incorporates the necessary intelligence required to complete transactions through the EDI Server Modules 202 and 207.

A provider 210 submits an insurance claim via an EDI-837 transaction set or other suitable transaction set to the Provider Receive Endpoint 212 component of the provider-facing EDI Server Module 202. The insurance claim is analyzed and rejected if it does not conform to set standards, e.g., the EDI-837 and/or other standards. Compliant insurance claims are forwarded to the Rules Engine 203.

The first step within the Rules Engine Component 203 is Eligibility Verification 218 whereby individual insurance claims are verified to be eligible for payment by a payer. The verification is performed through well-known EDI-270 (Eligibility Verification Request) and EDI-271 (Eligibility Verification Response) transaction sets.

At block 220, a determination is made as to whether the insurance claim is eligible for payment or ineligible for payment. If at block 220 the insurance claim is determined to be ineligible for payment, the insurance claim is returned to the provider 210 via Provider Send Endpoint 214. But if at block 220 the insurance claim is determined to be eligible for payment, then the insurance claim is provided to both the Rules Engine 222 (of the Rules Engine Module 203) and the AI/ML Engine 224 (of the AI/ML Module 204) for classification as valid (likely to be accepted for payment) or invalid (likely to be denied for payment).

The classification results from the Rules Engine 222 and the AI/ML Engine 224 are provided to the Decision Module 205 which provides a final prediction as to whether the insurance claim is valid or invalid. Additionally, for insurance claims that are determined to be invalid, the Decision Module 205 conducts an analysis and provides recommendations related information on the potential reason(s) for the invalid classification (i.e., the classification of the insurance claim as likely to be denied for payment) so that an intelligent agent or domain expert can 'fix' the insurance claim using the Claims Editor 206.

Insurance claims with a probability of denial lower than a set threshold are sent to the payer 242 via Payer Send Endpoint Module 236 via the EDI-837 transaction set for payment. Insurance claims with a high probability of denial are forwarded to the Claim Editor 206 to be corrected and re-submitted to the Rules Engine 222 and AI/ML Engine 224 for reclassification.

When a payer 242 pays an insurance claim, denies an insurance claim, or adjusts an insurance claim, the payer 242 (or a computing system at the payer 242) generates an EDI-835 transaction set (or other suitable transaction set) and transmits the information to the Payer Receive Endpoint 240. In some embodiments, the information regarding the payment/denial/adjustment of individual insurance claims received at the Payer Receive Endpoint 240 is used for retraining the AI Model(s) using Machine Learning techniques. This feedback loop enhances the performance of the AI Model(s) in an ongoing manner as it learns the various features of the denied insurance claims returned by the payer 242.

The Model Training Module 226 is configured to train the AI model using a novel "divide and conquer" method by adding categorical information so that ultra-high dimensional training data and the knowledge of the dataset can be utilized in training.

For example, insurance claims include Diagnosis Codes and Procedure Codes. Diagnosis Codes are standardized medical codes that describe medical diagnoses (e.g., diseases, ailments, conditions, and so on), and Procedure Codes are standardized medical codes that describe medical procedures (e.g., treatments, medications, surgical procedures, other medical procedures, and so on).

All the Diagnosis Codes and Procedure Codes are divided into separate categories corresponding to types of diseases, treatments, and/or other categories. Category information is added into the training data together with the actual combination(s) of Diagnosis and Procedure Codes corresponding to the category so that the category information can be used with combinations of Diagnosis and Procedure Codes for training the AI model. Combining the category information with the Diagnosis and Procedure Codes enables the AI model to learn the associations among the Diagnosis and Procedure Codes in addition to their categorical relationships. Organizing groupings/combinations of Diagnosis and Procedure Codes by category is important as there is no other way known to collect/synthesize sufficient training data to cover the all the necessary combinations of Diagnosis and Procedure Codes to train the AI model.

In operation, Model Training Module 226 is configured to continuously improve the performance and the accuracy of the AI/ML Engine 204 using actual data regarding insurance claims that payers have accepted, denied, and/or adjusted. For example, when the AI model 224 performs binary classification of denial (invalid) or non-denial (valid) where 0 and 1 are used to represent denial/invalid and non-denial/valid respectively at the AI model's output, a 0.5 at the output of the AI model 224 represents a low confidence level of either denial or non-denial. Similarly, a value 0.9 or above represents non-denial with high confidence; a value of 0.2 or below represents denial with high confidence.

When the AI/ML Engine 204 classifies a particular insurance claim with a low level of confidence, this confidence level is translated into a score for the classification. This score is associated with the insurance claim and sent to other modules for further decision making. For example, an insurance claim classified by the AI Model 224 with a low level of confidence shows that the insurance claim (and in particular, the features of the insurance claim) is not well represented in the training dataset. Thus, the insurance claim is a candidate to be included in the training data for future retraining to improve the accuracy of AI/ML Engine 204. This candidate insurance claim should be reviewed, and the classification should be verified by a domain knowledge expert, by a qualified staff member, or by the payer.

In some embodiments, insurance claims that the AI/ML Engine 204 classifies with a low confidence level are added into the training dataset as a part of an augmented training dataset. As shown in FIG. 2, insurance claims that the AI/ML Engine 204 classifies with a low confidence level are provided to the Model Training Module 226 for inclusion in a training dataset used for future retraining of the AI/ML Engine 204.

FIG. 3A shows an exemplary block diagram for an AI/ML Module 300 according to some embodiments. The AI/ML Module 300 may be the same as or similar to AI/ML Module 204 (FIG. 2) or AI/ML Engine 105 (FIG. 1). AI/ML Module 300 includes a Parametric Feature Extraction Module 301 and an Artificial Neural Network (ANN) Module 302.

In operation, the Parametric Feature Extraction Module 301 extracts feature vectors and scores from an insurance claim. The extracted feature vectors and scores for the insurance claim are used by Artificial Neural Network Model 302 to classify the insurance claim as valid (acceptable for the payment) or invalid (likely to be denied payment). In some embodiments, the Artificial Neural Network Model 302 is periodically updated with new weights.

FIG. 3B shows some aspects of the Parametric Feature Extraction Module 301 shown in FIG. 3A. The features of individual insurance claims extracted by the Parametric Feature Extraction Module 301 are used by the Neural Network Model 302 to classify insurance claims as valid or invalid.

As mentioned earlier, insurance claim data includes many features, including tens of thousands of Diagnosis and Procedure Codes, that describe (i) medical conditions that can be observed and diagnosed for patients and (ii) procedures that healthcare providers can perform. There is a very large number of such Diagnosis Codes and Procedure Codes that exist for both diagnoses and procedures. This very large number of categorical data results in training data having a very high dimensionality. While high dimensionality of the training data helps the Neural Network Model 302 learn better, the high dimensionality of the training data also underlines the need to have more data to help the Neural Network Model 302 make sense of this high dimensionality data ("The Curse of Dimensionality").

To ameliorate some of the problems that flow from high dimensionality data, some embodiments include approaches for dimensionality reduction on these two important sets of codes to help make the training of the model simpler. To reduce the dimensionality of the training data, some embodiments employ one or both of (i) binning of claims and (ii) a latent space transformation approach.

Binning is the process of grouping categorical variables. This process is useful in the case when many of the categories occur infrequently in the training data, so grouping them into categorical variables makes the frequency of the "binned" category larger. Some embodiments use the ICD-10 coding categories to group the Medical Codes into larger "bins" that would allow synthesis of more data regarding each category.

As shown in FIG. 3B, one can extract various relationships and associations among the Medical Codes having similar medical diagnoses and treatments with certain features at both the Medical Code (Diagnosis Codes and Procedure Codes) level and "binned" categorical level. This "divide and conquer" approach reduces the dimensionality of the insurance claims for training and subsequent analysis by the AI/ML Engine 300. For example, Diagnosis Related Group (DRG) code, gender, and age can be used to create relationship matrices, including (i) one or more autocorrelation matrices 312 and (ii) one or more cross-correlation matrices 313, from which one or more latent space matrices 315, 316 can be derived.

In operation, insurance claims 311 in the training dataset are used to create the autocorrelation matrices 313 and cross-correlation matrices 313, which describe the associations of various Medical Codes and their "binned" categories with selected features from the training dataset including many prior paid claims. For example, in some embodiments, individual entries in the one or more autocorrelation matrices 312 quantify how often Diagnosis Codes appear together within individual valid insurance claims of a set of valid insurance claims, such as the HCUP Dataset mentioned previously. And in some embodiments, individual entries in the one or more association matrices 313 quantify how often diagnosis codes and procedure codes appear together within individual valid insurance claims of the set of valid insurance claims, such as the previously mentioned HCUP Dataset. The one or more autocorrelation matrices 312 and one or more cross-correlation matrices 313 are sometimes referred to herein together as "Relationship Matrices" (RM).

When classifying insurance claims, the insurance claim to be classified is evaluated against the RMs to obtain a score for each RM. In the Parametric Feature Extraction Module 301, one or more latent space matrices 315, 316 are derived from the one or more cross-correlation matrices 313.

For example, a latent space matrix of A with indices of (i,j) where i represents a specific Diagnosis Code and j represents a specific Procedure Code describes whether a symptom of Diagnosis i will lead to the use of Procedure j. A '0' at A(i,j) represents that no existing claims in the training dataset ever contain the codes i and j together; thus, it is unlikely a claim with codes i and j will be accepted by the payer. Thus, an insurance claim containing codes i and j together is likely to be rejected and should therefore be classified as invalid. On the other hand, a high value at A(i,j) represents that many claims in the training dataset contained the combination of i and j together. Thus, an insurance claim that contains Diagnosis Code i and Procedure Code j is likely to be accepted for payment by the payer and should therefore be classified as valid.

The collections of various autocorrelation matrices 312 and cross-correlation matrices 313 (and latent space matrices derived therefrom) provide the basis for whether a claim should be classified as valid or invalid. In the Parametric Feature Extraction Module 301, the scores for individual insurance claims 310 and 321 are derived from scoring functions 314 and 319, corresponding to scores derived from the auto-correlation matrices 312 and cross-correlation matrices 313, respectively.

The collection of the obtained scores 310, 321 for an insurance claim based on each RM becomes the extracted features for the AI engine. Traditionally, similarity of two objects with multiple components or features are calculated by treating each object as a "vector." The metric distance between two vectors represents their similarity to each other. This is under an assumption that features and components of the objects are orthogonal or independent to each other. However, this assumption does not always hold with Medical Codes. Thus, the similarity of two insurance claims takes associations among the Medical Codes into consideration in this feature extraction process associated with the autocorrelation matrices 312. The compatibility of an insurance claim in comparison with a set of multiple known paid insurance claims in the training dataset should also take the Medical Codes' collective associations into consideration. Thus, the association based on the "binned" (or bucketed or data binning) categories is considered; for example, some codes are associated with 'digestive' and some are associated with 'circulatory.' Different scores can be obtained when comparing the similarity between the two objects using different weights for each component and their associations which take the form of a matrix or tensor. Likewise, different scores can be obtained when comparing the compatibility of an object with a collection of multiple known objects using not only the values of the specific component but also their associations with a particular set of weights.

Scores 321 generated from the latent space matrices 315 and 316 can at times make it challenging for any predictive model to understand the physical context. Scores generated from latent space matrices can at times make it challenging for any predictive model to understand physical context. This is because scoring functions are a further reduction of vectors representing medical codes in a claim, and are used to represent the association between Diagnosis and Procedure codes. It is likely, that one such low scoring pair's low value is suppressed by other higher scoring associations. By including the latent space vectors, the machine learning model is exposed to more context and information that just the scores. Using a combination of scores and vectors allows the machine learning model to be exposed to as much relevant information about the overall latent space that the codes are being transformed to. The word "latent" means "hidden." Latent can be used in machine learning to mean the following—you observe some data which is in the space that you can observe, and you want to map it to a latent space where similar data points are closer together. In some embodiments, the latent space matrices 315 and 316 include latent space features for both Diagnosis Codes and Procedure Codes separately. The vectors stored in 317 and 318 are generated by the latent space matrices 315 and 316, respectively. Examples of implementing functions for latent space matrices 315 and 316 include Latent Semantic Allocation and Latent Dirichlet Allocation. The AI/ML Model 300 makes decisions about whether to classify an insurance claim as valid or invalid based at least in part on the scores 321 of denial possibility and the context in latent space vectors 317, 318.

FIG. 4 shows an example operational flow 400 of a Fault Injection method to generate synthesized denial data for training the AI/ML Engine (such as any of the AI/ML Engines disclosed herein) according to some embodiments. When a fault has been injected into an insurance claim, the insurance claim is likely to be denied for payment by a payer.

To train an AI/ML Engine to classify input data, the training data should align with business knowledge. For example, in the context of insurance claim processing, current estimates are that the claim denial rate is around 15%. Thus, it would be advantageous for about 85% of the insurance claims in the training data to correspond to valid insurance claims and about 15% of the insurance claims in the training dataset to correspond to invalid insurance claims. In practice, however, the available dataset for training may not reflect a similar distribution between valid and invalid claims. Therefore, some embodiments disclosed herein include a novel Fault Injection process for synthesizing a variety of invalid insurance claims for inclusion into the training dataset to reflect a realistic distribution of denials.

In some embodiments, synthesizing invalid claims includes generating a new invalid claim based on one or more known valid claims but with slight variations that cause the newly-generated claim to be invalid.

Some embodiments use an adaptive sampling method to identify a valid claim to use as the basis for generating a new invalid claim. In operation, a training dataset comprising valid claims is divided into different categories based on the average Medical Code usage frequency of each insurance claim in the training dataset. A sampling rate or probability from each category is applied based on the category and the actual selection. For example, the training dataset is divided into categories of "rare cases," "frequent cases," and "normal cases." The selection probability applied to each category for sampling is different based on the specific category and the actual history of the selection in sequence. One way to perform the sampling is to sample from "rare cases" more often and "frequent cases" less often. Whenever a claim from a category is selected, the "weight" of each category to be used for the next sample can be adjusted.

FIG. 4 shows the flow diagram 400 of this Fault Injection process. Business knowledge provides certain conditions which are known to cause discrepancies in claims resulting in denial, i.e., these discrepancies cause an insurance claim to be classified as invalid. The Fault Injection process 400 uses such Discrepancy Information 402, which includes Feature Conditions, to modify a subset of Clean Data 401 (i.e., the known valid insurance claims) to introduce enough denials to approximate real-life claim denial distribution.

Discrepancy Information 402 includes both Diagnosis Codes and Procedure Codes classified into different categories. There are rules that govern which Procedure Code category would produce denial when it is associated with another Diagnosis Code category. The Fault Injection process 400 uses this information to add, delete or replace a code from a known non-denial claim (i.e., a known valid claim) to produce a denial claim (i.e., a synthesized invalid claim). For example, some Medical Codes can be associated with 'digestive' and some are associated with 'circulatory', a rule of using a Procedure Code in the category of 'digestive' to treat a Diagnosis Code in the 'circulatory' category can be used to generate an invalid insurance claim for use with training the AI/ML Engine.

The insurance claim data is inherently imbalanced as only a small percentage of all the claims get denied. This imbalance may still hold after synthesized denial claims are added.

It is possible to resample the minority class data (i.e., invalid claims) with replacement and/or resample the majority class (i.e., valid claims) without replacement to approximately match the samples of both the classes.

A modified SMOTE (Synthetic Minority Over-sampling Technique) creates synthetic samples from the minority class which may include both synthesized invalid claims and the original valid claims instead of simply creating copies. Synthetic Minority Oversampling Technique (SMOTE) is a very popular oversampling method to improve random oversampling. The algorithm associated with SMOTE selects two or more similar claims/instances (using a distance measure) and perturbs a claim/instance one at a time by a random amount with a difference from the neighboring instances according to the Feature and Fault Association Weight in the Fault Injection module.

Models focused on achieving just high accuracy, incur the same cost for both False Positives and False Negatives. On the other hand, Penalized/Cost-Sensitive Training penalizes mistakes on the minority class by an amount proportional to how under-represented it is in the dataset.

Traditional classifiers assume a 0.5 probability threshold for binary classification. Imbalanced data can be handled by learning an optimal probability threshold to classify the binary classes. As described herein, the actual probability produced by the AI/ML Engine classifier by examining an insurance claim is used by other modules as an indicator whether the insurance claim and/or its variations can be candidates for retraining the AI/ML Engine to improve its performance. A probability of 0.9 (or another provisioned threshold) and above represents a high confidence of the claim being classified as one class (e.g., valid) while a probability of 0.1 (or another provisioned threshold) and below represents a high confidence of the claim being classified as another class (e.g., invalid) when a binary classification is used. A probability in between the two provisioned thresholds represents lack of confidence of the AI/ML Engine to identify the claim based on the knowledge learned from training dataset. Thus, an insurance claim having a probability falling within the range of uncertainty for classification (e.g., between 0.9 and 0.1 in the above-described example scenario) should be a good candidate to be added into the training set for retraining the AI/ML Engine after the actual result has been thoroughly verified. The verification can be performed by either an expert, a qualified staff, or the payer. When an individual insurance claim's probability or probability score generated by an AI/ML Engine is or near 0.5, the AI/ML Engine is uncertain which class this specific claim should belong to. This claim represents a data point which needs to be augmented for the Engine's proper training.

For the Fault Injection Process 400, claim data 401 (known valid claims) are filtered at step 403 to identify a subset of known valid claims that satisfy certain conditions based on the Discrepancy Information 402. The insurance claims identified at step 403 are analyzed at step 404. Then, at step 405, the known valid claims analyzed at step 404 (or at least copies of the known valid claims) are modified to include Discrepancy Information 402 that is known to make the claim invalid. At block 406, the synthesized denial claims produced at block 405 are combined with the known valid claims from block 401 to generate a new training dataset comprising known valid insurance claims and synthesized invalid insurance claims.

FIG. 5A shows a process 500 implemented by a Decision Module, such as (i) the Decision Module 104 in FIG. 1 and/or (ii) the Interpretation and Decision Making function 228 of the Decision Module 205 shown in FIG. 2.

At block 501, process 500 includes, for an individual insurance claim, receiving (i) a classification of the claim returned by a Rules Engine (e.g., Rules Engine 103 of FIG. 1 or Rules Engine 222 of Rules Engine Module 203 in FIG. 2), and (ii) a classification of the insurance claim returned by an AI/ML Engine (e.g., AI/ML Engine 105 of FIG. 1 or AI Model 224 of AI/ML Engine 204 of FIG. 2). At block 501, the severity of the anomaly, if any, in the insurance claim is identified, along with the sources and types of the anomaly identified. For example, violation of a rule in the Rules Engine is considered an anomaly. Similarly, an input scored with a high level of certainty or uncertainty by an AI/ML Engine is also considered an anomaly. Anomalies are considered causes for denials, i.e., reasons why the insurance claim has been classified as invalid. Anomalies are specified and provisioned. The treatment of a Rule Violation from the Rules Engine, which is explicit with indication of reasons, is dealt differently from the violation flagged by the AI/ML Engine since the AI/ML Engine provides some probability but no reasoning.

The treatment of a Rule Violation is handled by Blocks in 600 (FIG. 6) according to a predetermined resolution procedure while the treatment of the results of the AI/ML Engine would be different since the AI/ML Engine would likely point to a set of possible anomaly sources rather than a specific source.

At blocks 502 and 503, the potential anomalies identified at block 501 are further examined. Block 502 includes analyzing the potential anomalies of the insurance claim based on a Feature Sensitivity Database. In some embodiments, the Feature Sensitivity Database is pre-calculated and pre-configured. This Feature Sensitivity Database includes the sensitivity of each Medical Code vs. gender and/or age based on the HCUP dataset. In general, multiple features like Procedure Codes are more 'Sensitive' to a certain Diagnosis Code when they are all used to treat that Diagnosis Code; on the contrary, Procedure Codes used to treat multiple Diagnosis Codes are less 'Sensitive' to the 'disappearing' of any one of those Diagnosis Codes. The actual 'Sensitivity' value due to the 'disappearing' of a Diagnosis Code for a claim is calculated using the co-occurrence matrix of the entire training dataset. For example, when the co-occurrence matrix entry for Procedure Code 1 (PC1) and Diagnosis Code 1 (DC1) is 3 while the entry for PC1 and Diagnosis Code (DC2) is 7, the 'Sensitivity' value of the disappearing of DC2 for a claim of PC1, DC1, and DC2 only is 7/(3+7)=0.7.

Block 503 includes analyzing the feature saliency and importance of the potential anomaly. Saliency measures are used for assessing a feature's relative importance. For example, when a decision tree algorithm is used, tree-specific measures that compute the average reduction in impurity across all trees in a random forest are evaluated for each feature. Features that tend to split nodes closer to the root of a tree will result in a larger important value (higher salience). For example, a feature combination of Diagnosis Code and Procedure Code in the claim represents a certain percentage of the information in the co-occurrence matrix; using the above mentioned PC1, DC1, DC2 scenario, PC1's saliency for the claim is 0.5 when DC1 and DC2 can also be treated using another Procedure Code 2 (PC2) with co-occurrence matrix entries of 5 and 5.

Block 504 includes estimating a value of the insurance claim using a multi-variable linear regression model established from the values of previous insurance claims.

Some embodiments of process 500 further include block 505, which includes, based on the results from blocks 501, 502, 503 and 504, determining whether to forward the insurance claim to a payer for payment or forward the insurance claim to a claim editor for review. However, in some embodiments, the decision of whether to forward the insurance claim to a payer for payment or forward the insurance to a claim editor for review occurs prior to block 501.

Embodiments that include block 505 are based on the knowledge that the results from the AI/ML Engine include not only the denial or non-denial of logical value (i.e., valid/invalid classification) but also a probability representing the confidence level and uncertainty/certainty. Insurance claims that have been classified as valid/invalid with a high-level of confidence are identified as such. With this level of confidence together with the probability produced by the AI/ML Engine, up to 10% of insurance claims in a batch of insurance claims are tagged with a low-level of confidence using a selection algorithm including the Odds algorithm in addition to the denial or non-denial classification from the AI/ML Engine. This is further explained with reference to block 520 of FIG. 5(b).

At block 505, when the Rules Engine and AI/ML Engine agree with each other and the claim is not tagged with uncertainty, the decision is straight forward. Whenever the results from AI/ML Engine and Rules Engine conflict with each other and the result from the AI/ML is tagged with an uncertainty tag, the selection of using AI/ML or Rules Engine results can be arbitrated using a credit-based system. This credit-based system is used to adjust the weights in making the 'Denial' decision as to whether a claim should be submitted to a payer for payment.

At block 505, if an insurance claim is determined to be valid, the claim is forwarded to the payer. But if at block 505, the insurance claim is determined to be invalid, the insurance claim is forwarded to a Claim Editor via one or more recommenders.

Some embodiments of process 500 include one or both of blocks 506 and 507. Block 506 includes a Local Interpretable Model-Agnostic Explanations (LIME) based recommender and block 507 includes a SHAPLEY Additive explanations (SHAP) based recommender.

The explainer/recommenders implemented at blocks 506 and/or 507 are used to interpret the possible reasons why a particular insurance claim has been classified as invalid, i.e., helping to identify why a payer is likely to reject that particular insurance claim for payment. The explainers/recommenders use the analysis results produced by blocks 501, 502, 503, and 504 to provide suggestions in addition to the analysis produced by themselves. Information produced by one or both blocks 506 and 507 together with the invalid claim are forwarded to the Claim Editor. In some embodiments, the invalid insurance claim can be corrected by a staff or a domain expert by using the recommendations from the recommenders at one or both of blocks 506 and 507 to edit the insurance claim with a claim editor, such as Claim Editor 107 (FIG. 1) or Claim Edit User Interface 232 of Claim Editor Module 206 (FIG. 2).

The LIME based recommender implemented at block 506 is model-agnostic, meaning that it can be applied to any machine learning model. The LIME technique attempts to understand the machine learning model by perturbing the input of data samples and understanding how the predictions change. The LIME based recommender implemented at block 506 is used to understand how a prediction (e.g., a prediction of whether an insurance claim is valid or invalid) was made for a single observation (i.e., a single insurance claim). For a specific prediction, LIME slightly changes one or more values of the insurance claim, like the payment value of the insurance claim with limited impact on Sum of Squares Error (SSE) vs Sum of Squares Regression (SSR), to create new data points to replace the original insurance claim, for example. By feeding these perturbed data points to a complex model, a relationship between the perturbed features and the model prediction emerges which can then be captured by a surrogate model.

Shapley values (SHAP), an idea borrowed from Game Theory, proposed by Dr. Lloyd Shapley can be used to interpret models. Unlike traditional ML models, Shapley values provide us local interpretations instead of a global interpretation, which can be more useful for hinting at problematic features to a claim editor. SHAP takes the base prediction as the basis, which is the probability of denial when all features are set to the mean value of that feature in the training set. It goes through the data claim-by-claim and feature-by-feature, varying its values to detect how a feature affects the base prediction keeping the other feature values fixed. This generates a "mini-explainer" which outputs a Shapley value for each feature of a claim, which is the magnitude of its influence on the probability of that claim's denial.

Types of recommenders other than LIME and SHAP can be used with process 500, too. For example, recommenders utilizing multi-class classification techniques can be added as part of the solution in addition to the recommenders implemented at blocks 506 and 507. A Multi-class classification makes the assumption that each sample is assigned to one and only one label: for instance, a fruit can be either an apple or a pear but not both at the same time.

FIG. 5B shows procedure 520, which identifies insurance claims having an uncertain classification result from the AI/ML Engine. Individual features (Diagnosis Code and/or Procedure Code of the insurance claim) have their sensitivity score calculated from block 502 (FIG. 5A). The combined sensitivity score of all features of an insurance claim takes into account the saliencies of each feature. The summation of all the features' sensitivities with the respective saliency rating results in a combined sensitivity of all the features of the insurance claim. This combined sensitivity of all the features of the insurance claim determines a range of uncertainty to be used for the insurance claim.

For example, when the combined sensitivity is normal, the probability score generated by the AI/ML Engine is considered uncertain when its value is between 0.9 and 0.2 or 0.8 and 0.1, which may depend in part on the Rules Engine result. On the other hand, when the combined sensitivity is high, the probability score generated by the AI/ML Engine is considered uncertain when it is between 0.95 and 0.1 or 0.9 and 0.05, which may depend in part on the Rules Engine result.

Block 521 includes generating an uncertainty score larger than 0 when the classification of an insurance claim is considered to be uncertain. When the classification of the insurance claim is not considered to be uncertain, the uncertainty score is set to 0. An example formula to generate the uncertainty score is to take the absolute value of subtracting the probability score by 0.5 followed by multiplication by 2 if the AI/ML Engine is a binary classifier with output value between 0 and 1. At block 522, the uncertainty scores of individual insurance claims are cached and ranked. At block 523, a provisioned percentage of the insurance claims ranked at block 522 are tagged with uncertainty based on the ranking of uncertainty scores at block 522.

FIG. 6 shows a credit-based scoring procedure 600 according to some embodiments. In some embodiments, the credit-based scoring procedure 600 may be implemented before block 501 of process 500 (FIG. 5A). In some embodiments, the credit-based scoring procedure 600 may be implemented at block 505 of process 500 (FIG. 5A). The credit-based scoring procedure 600 may additionally or alternatively be implemented at other points within the overall procedure of classifying insurance claims as valid or invalid.

In operation, the credit-based scoring procedure 600 helps to predict the suitability of a decision from the AI Engine in comparison with that of the Rules Engine based on the availability of credits in (i) credit bucket 602 corresponding to the AI/ML Engine and (ii) credit bucket 603 corresponding to the Rules Engine.

The credit-based scoring procedure 600 (*i*) deposits credits using a first time-based deposit rate for the Rules Engine and (ii) deposits credits using a second time-based deposit rate for the AI Engine. In some embodiments, the first time-based deposit rate for the Rules Engine is the same as the second time-based deposit rate for the AI Engine. In other embodiments, the first time-based deposit rate for the Rules Engine is different from the second time-based deposit rate for the AI Engine.

The credit-based scoring procedure 600 also (i) removes credits using a first time-based removal rate for the Rules Engine and (ii) removes credits using a second time-based removal rate for the AI Engine. In some embodiments, the first time-based removal rate for the Rules Engine is the same as the second time-based removal rate for the AI Engine. In other embodiments, the first time-based removal rate for the Rules Engine is different from the second time-based removal rate for the AI Engine.

While classifying an individual insurance claim, when there is a conflict between the classification of the insurance claim returned by the AI/ML Engine and the classification of the insurance claim returned by the Rules Engine, and when there is credit available to use the decision from AI/ML Engine or Rules Engine, a decision is made based on a weighted probability function at block 604. When the weighted probability function selects AI/ML Engine or Rules Engine, the credit is withdrawn from the respective credit bucket of 602 or 603.

When the AI/ML Engine credit bucket 602 is empty, the classification returned by the Rules Engine is selected at block 604, the weight at block 604 for the Rules Engine is increased, the weight at block 604 for AI/ML Engine is reduced, and the time-based deposit rate for the AI/ML Engine bucket 602 is increased. Likewise, when the Rules Engine credit bucket 603 is empty, the classification returned by the AI/ML Engine is selected at block 604, the weight at block 604 for AI/ML Engine is increased, the weight at block 604 for Rules Engine is decreased, and the time-based deposit rate for the Rules Engine bucket 603 is increased.

When the AI/ML Engine credit bucket 602 overflows, the AI/ML Engine time-based deposit rate is reduced while the corresponding weight for the AI/ML Engine at block 604 is increased for the AI/ML Engine and the weight at block 604 for Rules Engine is reduced. Similarly, when the Rules Engine credit bucket 603 overflows, the Rules Engine time-based deposit rate is reduced while the weight block 604 for the Rules Engine is increased and the weight at block 604 for the AI/ML Engine is decreased.

Process 600 is one example of a weight adjusted denial decision mechanism used for selecting one of the classifications returned from the Rules Engine and the AI/ML Engine for an individual insurance claim. The process 600 offers a good balance on exploration and exploitation that can also accommodate actual responses received from the payer about insurance claims, e.g., a response indicating that the payer accepted/denied/adjusted an insurance claim that had been classified as valid.

In some embodiments, when a response indicating that the payer accepted an insurance claim that had been classified as valid (i.e., likely to be accepted for payment), a corresponding reward is credited at block 605 or 606, depending on which of the AI/ML Engine or Rules Engine returned the correct classification. For example, when the selection of the classification returned by the Rules Engine is corroborated by the payer as mentioned above, a reward at block 601 is credited to the Rules Engine Credit Bucket 203 in the form of one or more credits. Similarly, when the selection of the classification returned by the AI/ML Engine corroborated by the payer as mentioned above, a reward at block 605 is credited to the AI/ML Engine Credit Bucket 602 in the form of one or more credits.

FIG. 7 shows an example process 700 performed by claim editor according to some embodiments. In some embodiments process 700 may be performed by a claim editor such as Claim Editor 107 (FIG. 1) and/or Claim Editor Module 206 (FIG. 2).

Process 700 begins at block 701 which includes receiving an insurance claim that has been classified as invalid (i.e., likely to be denied payment by a payer). Block 701 also includes identifying and extracting some (or all) of the Medical Codes and features in the insurance claim and allocated internal variables representing all the features of the insurance claim including those shown in the HCUP dataset.

Next, process 700 advances to block 702, which includes updating the values of the internal variables of the insurance claim according to one or more recommendations provided from the Recommendation Combiner procedure implemented at block 705. The Recommendation Combiner procedure implemented at block 705 generates one or more recommendations from one or more recommenders (e.g., recommendations from LIME and SHAP recommenders as described with reference to FIG. 5A) based on a set of weights, where the weights correspond to normalized scores provided by the recommenders. In operation, the recommendations provided at block 705 can be used to edit/modify an insurance claim so as to make it valid (i.e., likely to be paid by a payer).

Next, process 700 advances to block 703, which includes confirming the edits/modifications that occurred at block 702 by approving the insurance claim. The approval at block 702 may be performed either by the computing system or by an authorized person.

Next, process 700 advances to block 704, which includes forwarding the edited/modified insurance claim to the payer. In some embodiments, the edited/modified insurance claim is transmitted to the payer via an EDI Server, for example, as described with reference to FIG. 2. In some embodiments, the edited/modified insurance claim may be fed back through the Rules Engine and AI/ML Engine for reclassification, as described with reference to FIG. 2.

In some embodiments, the AI/ML Engine includes multiple models. For example, a neural network based model and a co-occurrence matrix based model can be used for similar tasks. Various models have their own characteristics, especially when they are processing ultra-high dimensional data. For example, co-occurrence matrix based models have the tendency to approximate unknown information toward 0 depending on the meaning of this 0, while the neural network based models behave more randomly. For example, the neural network based models sometimes fit non-linear situation better while co-occurrence Matrix based models sometimes generalizes the tasks better.

FIG. 8A shows a process 800 for combining results from two machine learning models according to some embodiments. In some embodiments, at least some aspects of process 800 may be implemented at AI Model Block 224 of the AI/ML Engine Module 204 (FIG. 2).

Process 800 begins at block 801, which includes providing the same insurance claim to both a neural network machine learning model 803 and a co-occurrence matrix machine learning model 802. In operation, the neural network model 803 returns a first result for the insurance claim, and the co-occurrence matrix model 802 returns a second result for the insurance claim, where each of the first result returned by the neural network model 802 and the second result returned by the co-occurrence matrix model 802 is converted to a value between 0 and 1, by using a sigmoid function for example. A sigmoid function is a mathematical function having a characteristic S-shaped curve or sigmoid curve.

Next, the results from the neural network model 803 and co-occurrence matrix model 802 are provided to the Decision Logic and Confidence Level Estimation at block 804. The Decision Logic and Confidence Level Estimation at block 804 provides a decision (e.g., a classification) based on confidence levels associated with each of the neural network model 803 and the co-occurrence model 802. For example, the inputs from both the neural network model 803 and co-occurrence model 802 are divided into multiple confidence levels such as 0-high-confident, 0-low-confident, 1-low-confident, 1-high-confident. A provisioned rule and a set of thresholds can be used to decide the region of each confidence levels. For example, a value higher than 0.9 can be 1-high-confident; 0.5 to 0.9 can be 1-low-confident; 0.2 to 0.5 can be 0-low-confident; lower than 0.2 can be 0-high-confident.

FIG. 8B shows an example logic implementation of the Decision Logic and Confidence Level Estimation at block 804 according to some embodiments.

When the result returned from the co-occurrence model 802 is either a 0-low-confident or 0-high-confident, a decision of 0 is produced, i.e., the insurance claim is classified as invalid, meaning that a payer is likely to reject the insurance claim for payment.

When the result from the co-occurrence matrix model 802 and the result from the neural network model 803 are both either 1-high-confident or 1-low-confident, a decision of 1 is produced, i.e., the insurance claim is classified as valid, meaning that a payer is likely to accept and pay the insurance claim.

When the result from the neural network model 803 is 0-high-confident, a decision of 0 is produced, i.e., the insurance claim is classified as invalid, meaning that a payer is likely to reject the insurance claim for payment.

When the result from the neural network 803 is 0-low-confident but the result from the co-occurrence matrix model is 1-low-confident from 0802, a decision of 0 is produced, i.e., the insurance claim is classified as invalid, meaning that a payer is likely to reject the insurance claim for payment.

When the result from the neural network model 803 is 0-low-confident but the result from the co-occurrence matrix model 802 is 1-high-confident, then a decision of 1 is produced, i.e., the insurance claim is classified as valid, meaning that a payer is likely to accept and pay the insurance claim. Similarly, the other resolutions can be derived using FIG. 8B.

FIG. 9 shows a method 900 of selecting a classification of input data from one of two classification systems according to some embodiments. Although the method steps are depicted in serial, some functions described in method 900 may be performed in parallel.

In some embodiments, method 900 is performed by a system comprising one or more computing devices such as the system shown and described with reference to FIG. 2.

Method 900 begins at step 902, which includes receiving an input data item. In some embodiments, the input data item comprises an insurance claim.

Next, method 900 proceeds to step 904, which includes using a Rules Engine to generate a first classification of the input data item. In some embodiments where the input data item is an insurance claim, the step of using the Rules Engine to generate the first classification of the input data item comprises classifying the insurance claim as one of valid or invalid, wherein a valid claim is likely to be accepted or payment, and wherein an invalid claim is likely to be denied payment.

Next, method 900 proceeds to step 906, which includes using an Artificial Intelligence/Machine Learning (AI/ML) Engine to generate a second classification of the input data item. In some embodiments, steps 904 and 906 may occur in parallel or substantially in parallel. In some embodiments where the input data item is an insurance claim, the step of using the AI/ML Engine to generate the second classification of the input data item comprises classifying the insurance claim as one of valid or invalid.

Next, method 900 proceeds to step 908, which includes determining whether the first classification differs from the second classification.

Next, method 900 proceeds to step 910, which includes in response to determining that the first classification does not differ from the second classification, returning a classification for the input data item that is the same as the first classification and the second classification.

Next, method 900 proceeds to step 912, which includes in response to determining that the first classification differs from the second classification, (i) selecting one of the first classification or the second classification according to a weighted selection procedure based on a first set of credits associated with the Rules Engine and a second set of credits associated with the AI/ML Engine, and (ii) assigning the input data item a classification according to the selected one of the first classification or the second classification.

In some embodiments, (i) the first set of credits is based on (a) a first time-based credit deposit rate, (b) previous input data correctly classified by the Rules Engine, and (c) a first time-based credit removal rate, and (ii) the second set of credits is based on (a) a second time-based credit deposit rate, (b) previous input data correctly classified by the AI/ML Engine, and (c) a second time-based credit removal rate In some embodiments, selecting one of the first classification or the second classification according to a weighted selection procedure based on a first set of credits associated with the Rules Engine and a second set of credits associated with the AI/ML Engine at step 912 comprises: (i) when the credits in the first set of credits associated with the Rules Engine is greater than the credits in the second set of credits associated with the AI/ML Engine; and (ii) when the credits in the first set of credits associated with the Rules Engine is less than the credits in the second set of credits associated with the AI/ML Engine.

In some embodiments, method 900 may additionally include, for an individual input data item: (i) determining a probability that the selected one of the first classification or the second classification is an accurate classification of the input data item; (ii) when the probability that the selected one of the first classification or the second classification is an accurate classification is greater than a threshold probability, confirming the selected one of the first classification or the second classification; and (iii) when the probability that the selected one of the first classification or the second classification is an accurate classification is lower than the threshold probability, designating the input data item and the selected one of the first classification or the second classification for review by a human reviewer.

Some embodiments additionally include managing the first and second sets of credits. For example, some embodiments include maintaining the first set of credits by (i) adding credits to the first set of credits according to the first time-based credit deposit rate, (ii) adding a credit to the first set of credits in response to determining that the Rules Engine correctly classified an input data item, and (iii) removing credits from the first set of credits at the first time-based credit removal rate. And some embodiments include maintaining the second set of credits by (i) adding credits to the second set of credits according to the second time-based credit deposit rate, (ii) adding a credit to the second set of credits in response to determining that the AI/ML Engine correctly classified an input data item, and (iii) removing credits from the second set of credits at the second time-based credit removal rate.

In some embodiments, managing the first and second sets of credits includes in response to the first set of credits accumulating more than a predetermined threshold amount of credits, either (i) decreasing the first time-based credit deposit rate or (ii) increasing the first time-based credit removal rate; and in response to the second set of credits accumulating more than a predetermined threshold amount of credits either (i) decreasing the second time-based credit deposit rate or (ii) increasing the second time-based credit removal rate. In some embodiments, the first time-based credit deposit rate is different from the second time-based credit deposit rate. In some embodiments, the first time-based credit removal rate is different from the second time-based credit removal rate. In some embodiments, the first time-based credit deposit rate is different from the first time-based credit removal rate. And in some embodiments, the second time-based credit deposit rate is different from the second time-based credit removal rate.

Figure 10:
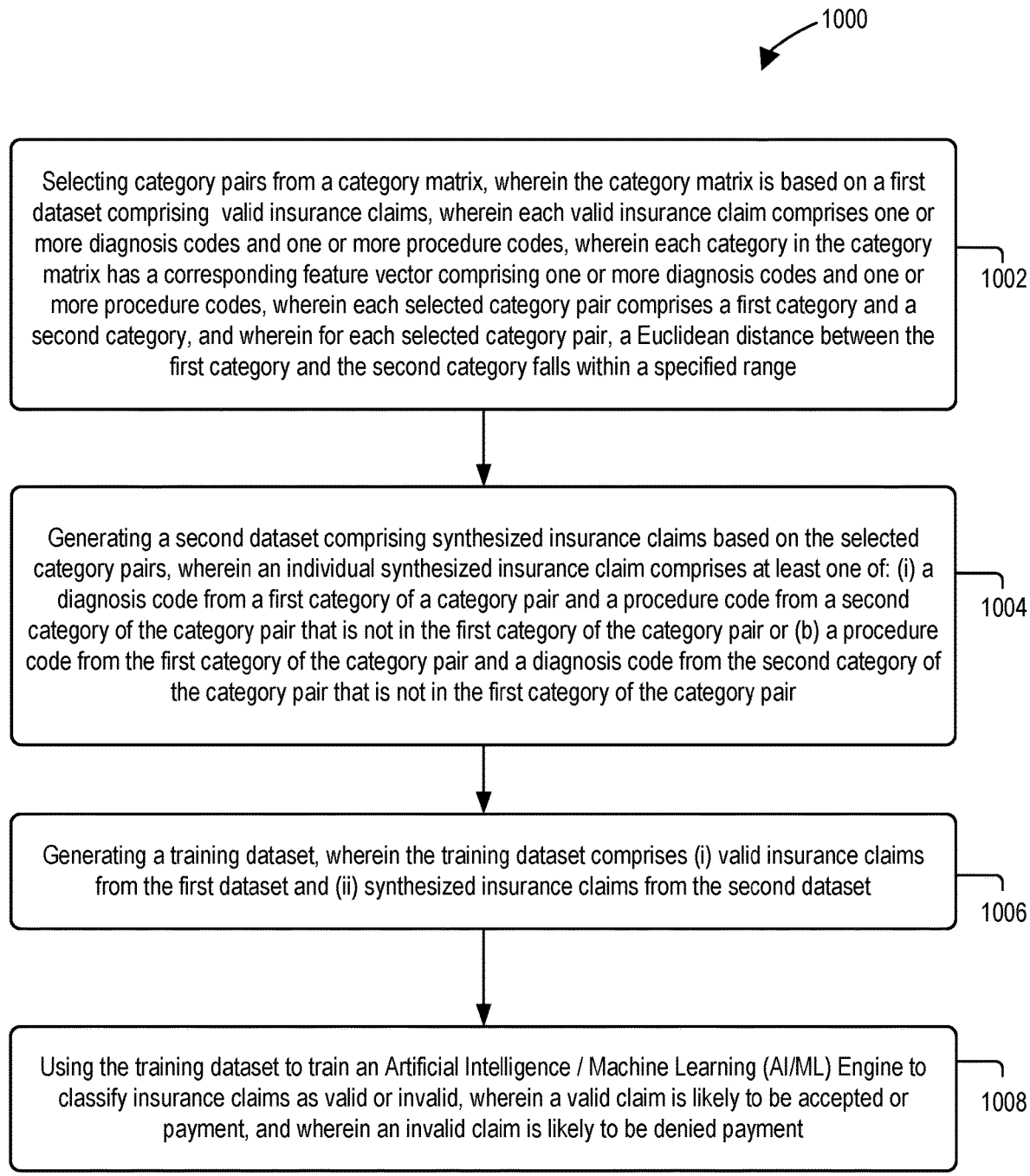
FIG. 10 shows an example method 1000 of generating synthesized insurance claims according to some embodiments.

FIG. 10 shows a method 1000 of generating synthesized insurance claims according to some embodiments for inclusion in a training data set. In operation, the synthesized insurance claims are used to train an Artificial Intelligence/Machine Learning (AI/ML) Engine to classify insurance claims as valid or invalid. Although the method steps are depicted in serial, some functions described in method 1000 may be performed in parallel.

Method 1000 begins at step 1002, which includes selecting category pairs from a category matrix, wherein the category matrix is based on a first dataset comprising valid insurance claims, wherein each valid insurance claim comprises one or more diagnosis codes and one or more procedure codes, wherein each category in the category matrix has a corresponding feature vector comprising one or more diagnosis codes and one or more procedure codes, wherein each selected category pair comprises a first category and a second category, and wherein for each selected category pair, a Euclidean distance between the first category and the second category falls within a specified range.

Some embodiments include generating the category matrix based on the valid insurance claims in the first dataset. Other embodiments include receiving the category matrix based on the valid insurance claims in the first dataset.

Next, method 1000 advances to step 1004, which includes generating a second dataset comprising synthesized insurance claims based on the selected category pairs, wherein an individual synthesized insurance claim comprises at least one of: (i) a diagnosis code from a first category of a category pair and a procedure code from a second category of the category pair that is not in the first category of the category pair or (b) a procedure code from the first category of the category pair and a diagnosis code from the second category of the category pair that is not in the first category of the category pair.

Next, method 1000 advances to step 1006, which includes generating a training dataset, wherein the training dataset comprises (i) valid insurance claims from the first dataset and (ii) synthesized insurance claims from the second dataset. In some embodiments, the training dataset further comprises actual insurance claims that have been accepted or rejected by one or more payers. In still further embodiments, the training dataset further comprises verified insurance claims, wherein each verified insurance claim comprises an insurance claim that has been (i) previously classified by the Artificial Neural Networks (ANN) module as valid and (ii) thereafter verified as either valid or invalid by a payer.

Next, method 1000 advances to step 1008, which includes using the training dataset to train an Artificial Intelligence/Machine Learning (AI/ML) Engine to classify insurance claims as valid or invalid, wherein a valid claim is likely to be accepted or payment, and wherein an invalid claim is likely to be denied payment. In some embodiments, the AI/ML engine comprises (i) a parametric feature extraction module and (ii) an Artificial Neural Network (ANN) module configured to classify insurance claims as valid or invalid. In some embodiments, the parametric feature extraction module and the ANN are similar to or the same as the parametric feature extraction module and ANN shown and described herein with reference to FIGS. 3A and 3B.

In some embodiments, the parametric feature extraction module of the AI/ML engine includes a plurality of matrices comprising (i) one or more auto-correlation matrices, (ii) one or more association matrices, and (iii) one or more latent space matrices. Some embodiments further include maintaining an auto-correlation matrix for the parametric feature extraction module of the AI/ML Engine, wherein individual entries in the auto-correlation matrix quantify how often diagnosis codes appear together within individual valid insurance claims of a set of valid insurance claims. Some embodiments also include maintaining a plurality of latent space matrices based on an association matrix for the parametric feature extraction module of the AI/ML Engine, wherein individual entries in the association matrix quantify how often diagnosis codes and procedure codes appear together within individual valid insurance claims of the set of valid insurance claims.

Embodiments that include the above-described auto-correlation, association, and latent space matrices may also include: (i) using the auto-correlation matrix and the latent space matrices to generate feature vectors based on the training dataset; and (ii) wherein using the training dataset to train the AI/ML Engine to classify insurance claims as valid or invalid comprises using the generated feature vectors to train the ANN module of the AI/ML Engine.

In some embodiments, method 1000 may further comprise generating a testing dataset, wherein the testing dataset comprises one or more of: (i) valid insurance claims from the first dataset that are not included in the training dataset and (ii) synthesized insurance claims of the second dataset that are not included in the training dataset; and using the testing dataset to test how well the ANN module classifies insurance claims as valid or invalid.

Figure 11:
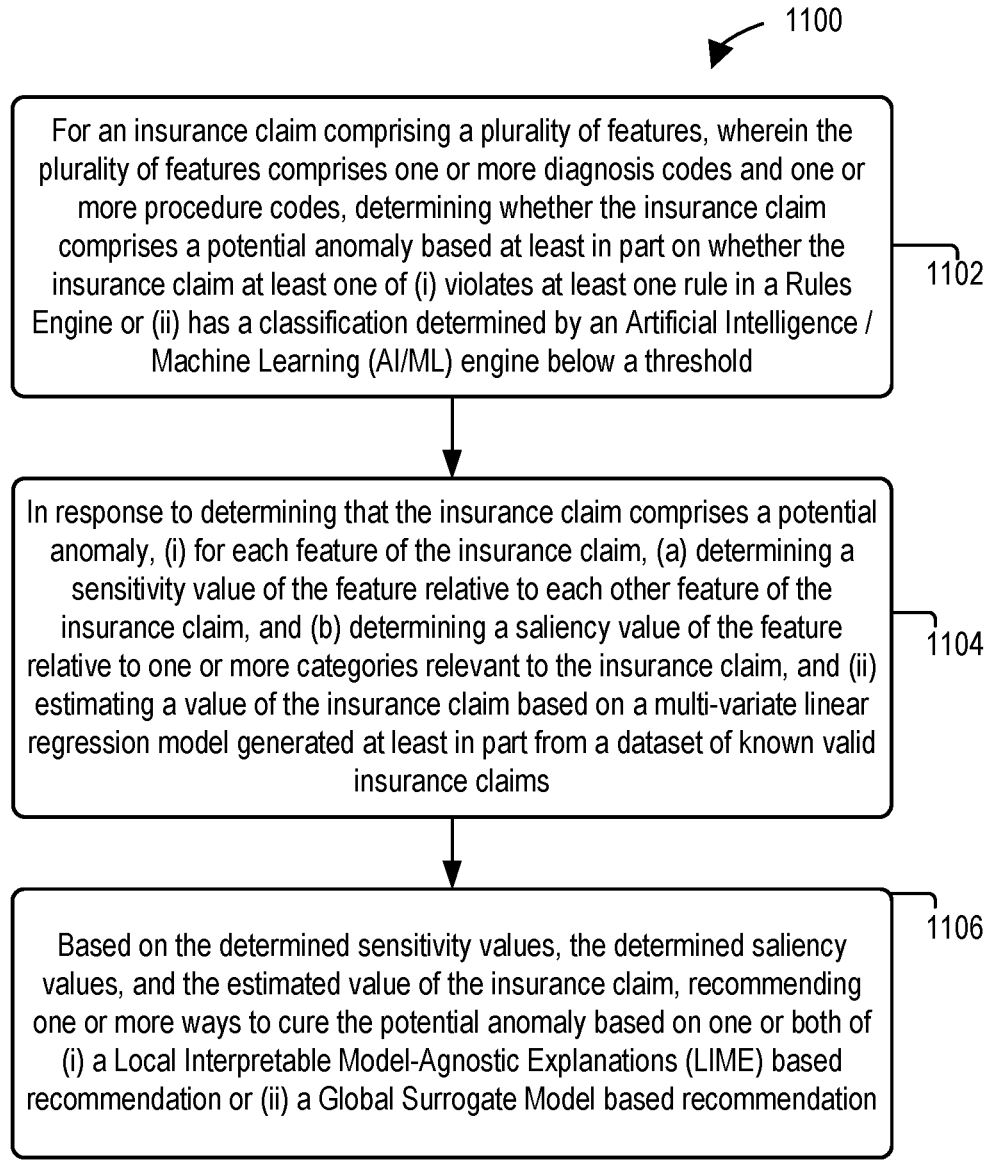
FIG. 11 shows an example method 1100 of recommending one or more ways to cure a potential anomaly in an insurance claim according to some embodiments.

FIG. 11 shows a method 1100 shows a method recommending one or more ways to cure a potential anomaly in an insurance claim. Although the method steps are depicted in serial, some functions described in method 1000 may be performed in parallel.

Method 1100 begins at step 1102, which includes for an insurance claim comprising a plurality of features (wherein the plurality of features comprises one or more diagnosis codes, and one or more procedure codes, and age, gender, service date, type of claim, etc.), determining whether the insurance claim comprises a potential anomaly based at least in part on whether the insurance claim at least one of (i) violates at least one rule in a Rules Engine or (ii) has a classification determined by an Artificial Intelligence/Machine Learning (AI/ML) engine below a threshold.

In some embodiments, determining whether the insurance claim comprises a potential anomaly based at least in part on whether the insurance claim violates at least one rule in the Rules Engine comprises determining whether the insurance claim comprises at least one of (i) a combination of one or more procedure codes that violates a rule in the Rules Engine, (ii) combination of one or more diagnosis codes that violates a rule in the Rules Engine, (iii) a combination of one or more diagnosis codes with one or more procedure codes that violates a rule in the Rules Engine, (iv) a combination of patient gender and one or more diagnosis codes or procedure codes that violates a rule in the Rules Engine, or (v) a combination of patient age and one or more diagnosis codes or procedure codes that violates a rule in the Rules Engine or (vi) a combination of other factors such as service dates, type of claim, etc. that violates a rule in the Rules Engine.

In some embodiments, determining whether the insurance claim comprises a potential anomaly based at least in part on whether the insurance claim has a classification determined by an Artificial Intelligence/Machine Learning (AI/ML) engine below a threshold comprises determining that the classification (or score) of the insurance claim by the AI/ML engine falls below a threshold of one of (i) less than about 0.9, (ii) less than about 0.8, or (iii) less than about 0.75.

Next, method 1100 advances to step 1104, which includes in response to determining that the insurance claim comprises a potential anomaly, (i) for each feature of the insurance claim, (a) determining a sensitivity value of the feature relative to each other feature of the insurance claim, and (b) determining a saliency value of the feature relative to one or more categories relevant to the insurance claim, and (ii) estimating a value of the insurance claim based on a multi-variate linear regression model generated at least in part from a dataset of known valid insurance claims.

In some embodiments, for each feature of the insurance claim, determining a sensitivity value of the feature relative to each other feature of the insurance claim comprises looking up a feature sensitivity for each feature in a feature-to-feature sensitivity database comprising sensitivities of features as a function of other features based on the dataset of known valid insurance claims.

In some embodiments, for each feature of the insurance claim, determining a saliency value of the feature relative to one or more categories relevant to the insurance claim comprises looking up saliency value of each feature in a feature-to-category saliency database comprising saliencies of features as a function of categories of insurance claims.

In some embodiments, estimating a value of the insurance claim based on a multi-variate linear regression model generated at least in part from the dataset of known valid insurance claims comprises estimating a value of the insurance claim based on values of other known valid insurance claims that have one or more of the same features as the insurance claim.

Next, method 1100 advances to step 1106, which includes based on the determined sensitivity values, the determined saliency values, and the estimated value of the insurance claim, recommending one or more ways to cure the potential anomaly based on one or both of (i) a Local Interpretable Model-Agnostic Explanations (LIME) based recommendation or (ii) a SHAP based recommendation.

In some embodiments, the SHAPLEY Additive explanations (SHAP) recommendations. In some embodiments, recommending one or more ways to cure the potential anomaly comprises generating a sorted listing of features of the insurance claim likely related to the potential anomaly, wherein the sorted listing is sorted according to at least one of (i) SHAP scores of the features of the insurance claim likely related to the potential anomaly, (ii) sensitivity values of the features of the insurance claim likely related to the potential anomaly, or (iii) saliency values of the features of the insurance claim likely related to the potential anomaly.

In some embodiments, for step 1102, determining whether the insurance claim comprises a potential anomaly based at least in part on whether the insurance claim (i) violates at least one rule in a Rules Engine or (ii) has a classification determined by an Artificial Intelligence/Machine Learning (AI/ML) engine below a threshold comprises: (i) using the Rules Engine to classify the insurance claim as one of (a)

acceptable for payment or (b) unacceptable for payment; and (ii) using the AI/ML Engine to classify the insurance claim as one of (a) acceptable for payment or (b) unacceptable for payment. When the Rules Engine and the AI/ML Engine both classify the insurance claim as acceptable for payment, then step 1102 includes sending the insurance claim to a payer for payment. When the Rules Engine and the AI/ML Engine both classify the insurance claim as unacceptable for payment, then step 1102 includes concluding that the insurance claim comprises a potential anomaly. And when one of the Rules Engine or the AI/ML Engine classifies the insurance claim as acceptable for payment and the other of the Rules Engine or the AI/ML Engine classifies the insurance claim as unacceptable for payment, the step 1102 includes assigning the insurance claim the classification generated by the Rules Engine or the classification generated by the AI/ML Engine based on a weighted selection procedure comprising a first set of credits associated with the Rules Engine and a second set of credits associated with the AI/ML Engine. In some embodiments, the weighted selection procedure may be similar to or the same as the weighted selection procedures disclosed and described herein.

In some embodiments, assigning the insurance claim the classification generated by the Rules Engine or the classification generated by the AI/ML Engine based on the weighted selection procedure further comprises: (i) when a number of credits in the first set of credits associated with the Rules Engine exceeds a number of credits in the second set of credits associated with the AI/ML Engine, assigning the insurance claim the classification generated by the Rules Engine; and (ii) when a number of credits in the first set of credits associated with the Rules Engine is less than a number of credits in the second set of credits associated with the AI/ML Engine, assigning the insurance claim the classification generated by the AI/ML Engine.

In some embodiments, the first set of credits is based on (a) a first time-based credit deposit rate, (b) previous insurance claims correctly classified by the Rules Engine, and (c) a first time-based credit removal rate. And in some embodiments, the second set of credits is based on (a) a second time-based credit deposit rate, (b) previous insurance claims correctly classified by the AI/ML Engine, and (c) a second time-based credit removal rate.

In some embodiments that include the above-described credit based system, method 1100 may also include maintaining the first and second sets of credits.

For example, some embodiments of method 1100 include maintaining the first set of credits by (i) adding credits to the first set of credits according to the first time-based credit deposit rate, (ii) adding a credit to the first set of credits in response to determining that the Rules Engine correctly classified an insurance claim, and (iii) removing credits from the first set of credits at the first time-based credit removal rate. Such embodiments may further include maintaining the second set of credits by (i) adding credits to the second set of credits according to the second time-based credit deposit rate, (ii) adding a credit to the second set of credits in response to determining that the AI/ML Engine correctly classified an insurance claim, and (iii) removing credits from the second set of credits at the second time-based credit removal rate. Some embodiments may further include in response to the first set of credits accumulating more than a predetermined threshold amount of credits, either (i) decreasing the first time-based credit deposit rate or (ii) increasing the first time-based credit removal rate; and in response to the second set of credits accumulating more than a predetermined threshold amount of credits either (i) decreasing the second time-based credit deposit rate or (ii) increasing the second time-based credit removal rate.

In some embodiments, at least one of (i) the first time-based credit deposit rate is different than the second time-based credit deposit rate, (ii) the first time-based credit removal rate is different than the second time-based credit removal rate, (iii) the first time-based credit deposit rate is different than the first time-based credit removal rate, or (iv) the second time-based credit deposit rate is different than the second time-based credit removal rate.

What is claimed is:

1. Tangible, non-transitory computer readable media comprising instructions stored therein, wherein the instructions, when executed by one or more processors cause a computing system to perform functions comprising:
   selecting category pairs from a category matrix, wherein the category matrix is based on a first dataset comprising valid insurance claims, wherein each valid insurance claim comprises one or more diagnosis codes and one or more procedure codes, wherein each category in the category matrix has a corresponding feature vector comprising one or more diagnosis codes and one or more procedure codes, wherein each selected category pair comprises a first category and a second category, and wherein for each selected category pair, a mathematical distance between the first category and the second category falls within a specified range;
   generating a second dataset comprising synthesized insurance claims based on the selected category pairs, wherein an individual synthesized insurance claim comprises at least one of: (i) a diagnosis code from a first category of a category pair and a procedure code from a second category of the category pair that is not in the first category of the category pair or (ii) a procedure code from the first category of the category pair and a diagnosis code from the second category of the category pair that is not in the first category of the category pair;
   generating a training dataset, wherein the training dataset comprises (i) valid insurance claims from the first dataset and (ii) synthesized insurance claims from the second dataset; and
   using the training dataset to train an Artificial Intelligence/Machine Learning (AI/ML) Engine to classify insurance claims as valid or invalid, wherein a valid claim is likely to be accepted for payment, and wherein an invalid claim is likely to be denied payment.

2. The tangible, non-transitory computer-readable media of claim 1, wherein the functions further comprise:
   generating the category matrix based on the valid insurance claims in the first dataset.

3. The tangible, non-transitory computer-readable media of claim 1, wherein the functions further comprise:
   receiving the category matrix based on the valid insurance claims in the first dataset.

4. The tangible, non-transitory computer readable media of claim 1, wherein the AI/ML engine comprises (i) a parametric feature extraction module and (ii) an Artificial Neural Network (ANN) module configured to classify insurance claims as valid or invalid.

5. The tangible, non-transitory computer readable media of claim 4, wherein functions further comprise:
   maintaining an auto-correlation matrix for the parametric feature extraction module of the AI/ML Engine, wherein individual entries in the auto-correlation matrix quantify how often diagnosis codes appear together within individual valid insurance claims of a set of valid insurance claims; and maintaining a plurality of latent space matrices based on an association matrix for the parametric feature extraction module of the AI/ML Engine, wherein individual entries in the association matrix quantify how often diagnosis codes and procedure codes appear together within individual valid insurance claims of the set of valid insurance claims.

6. The tangible, non-transitory computer readable media of claim 5, wherein the functions further comprise:

using the auto-correlation matrix and the latent space matrices to generate feature vectors based on the training dataset; and wherein using the training dataset to train the AI/ML Engine to classify insurance claims as valid or invalid comprises using the generated feature vectors to train the ANN module of the AI/ML Engine.

7. The tangible, non-transitory computer-readable media of claim 1, wherein the training dataset further comprises actual insurance claims that have been accepted or rejected by one or more payers.

8. The tangible, non-transitory computer-readable media of claim 1, wherein the training dataset further comprises verified insurance claims, wherein each verified insurance claim comprises an insurance claim that has been (i) previously classified by the ANN module as valid and (ii) thereafter verified as either valid or invalid by a payer.

9. The tangible, non-transitory computer readable media of claim 1, wherein the functions further comprise:

generating a testing dataset, wherein the testing dataset comprises one or more of: (i) valid insurance claims from the first dataset that are not included in the training dataset and (ii) synthesized insurance claims of the second dataset that are not included in the training dataset; and using the testing dataset to test how well the ANN module classifies insurance claims as valid or invalid.

10. A method performed by a computing system, the method comprising:

selecting category pairs from a category matrix, wherein the category matrix is based on a first dataset comprising valid insurance claims, wherein each valid insurance claim comprises one or more diagnosis codes and one or more procedure codes, wherein each category in the category matrix has a corresponding feature vector comprising one or more diagnosis codes and one or more procedure codes, wherein each selected category pair comprises a first category and a second category, and wherein for each selected category pair, a mathematical distance between the first category and the second category falls within a specified range;

generating a second dataset comprising synthesized insurance claims based on the selected category pairs, wherein an individual synthesized insurance claim comprises at least one of: (i) a diagnosis code from a first category of a category pair and a procedure code from a second category of the category pair that is not in the first category of the category pair or (ii) a procedure code from the first category of the category pair and a diagnosis code from the second category of the category pair that is not in the first category of the category pair;

generating a training dataset, wherein the training dataset comprises (i) valid insurance claims from the first dataset and (ii) synthesized insurance claims from the second dataset; and using the training dataset to train an Artificial Intelligence/Machine Learning (AI/ML) Engine to classify insurance claims as valid or invalid, wherein a valid claim is likely to be accepted for payment, and wherein an invalid claim is likely to be denied payment.

11. The method of claim 10, wherein the method further comprises:

generating the category matrix based on the valid insurance claims in the first dataset.

12. The method of claim 10, wherein the method further comprises:

receiving the category matrix based on the valid insurance claims in the first dataset.

13. The method of claim 10, wherein the AI/ML engine comprises (i) a parametric feature extraction module and (ii) an Artificial Neural Network (ANN) module configured to classify insurance claims as valid or invalid.

14. The method of claim 13, wherein method further comprises:

maintaining an auto-correlation matrix for the parametric feature extraction module of the AI/ML Engine, wherein individual entries in the auto-correlation matrix quantify how often diagnosis codes appear together within individual valid insurance claims of a set of valid insurance claims; and maintaining a plurality of latent space matrices based on an association matrix for the parametric feature extraction module of the AI/ML Engine, wherein individual entries in the association matrix quantify how often diagnosis codes and procedure codes appear together within individual valid insurance claims of the set of valid insurance claims.

15. The method of claim 14, wherein the method further comprises:

using the auto-correlation matrix and the latent space matrices to generate feature vectors based on the training dataset; and wherein using the training dataset to train the AI/ML Engine to classify insurance claims as valid or invalid comprises using the generated feature vectors to train the ANN module of the AI/ML Engine.

16. The method of claim 10, wherein the training dataset further comprises actual insurance claims that have been accepted or rejected by one or more payers.

17. The method of claim 10, wherein the training dataset further comprises verified insurance claims, wherein each verified insurance claim comprises an insurance claim that has been (i) previously classified by the ANN module as valid and (ii) thereafter verified as either valid or invalid by a payer.

18. The method of claim 10, wherein the method further comprises:

generating a testing dataset, wherein the testing dataset comprises one or more of: (i) valid insurance claims from the first dataset that are not included in the training dataset and (ii) synthesized insurance claims of the second dataset that are not included in the training dataset; and using the testing dataset to test how well the ANN module classifies insurance claims as valid or invalid.

19. A computing system comprising:

one or more processors; and tangible, non-transitory computer readable media comprising instructions stored therein, wherein the instructions, when executed by the one or more processors cause the computing system to perform functions comprising:

selecting category pairs from a category matrix, wherein the category matrix is based on a first dataset comprising valid insurance claims, wherein each valid insurance claim comprises one or more diagnosis codes and one or more procedure codes, wherein each category in the category matrix has a corresponding feature vector comprising one or more diagnosis codes and one or more procedure codes, wherein each selected category pair comprises a first category and a second category, and wherein for each selected category pair, a mathematical distance between the first category and the second category falls within a specified range;

generating a second dataset comprising synthesized insurance claims based on the selected category pairs, wherein an individual synthesized insurance claim comprises at least one of: (i) a diagnosis code from a first category of a category pair and a procedure code from a second category of the category pair that is not in the first category of the category pair or (ii) a procedure code from the first category of the category pair and a diagnosis code from the second category of the category pair that is not in the first category of the category pair;

generating a training dataset, wherein the training dataset comprises (i) valid insurance claims from the first dataset and (ii) synthesized insurance claims from the second dataset; and using the training dataset to train an Artificial Intelligence/Machine Learning (AI/ML) Engine to classify insurance claims as valid or invalid, wherein a valid claim is likely to be accepted for payment, and wherein an invalid claim is likely to be denied payment.

20. The computing system of claim 19, wherein the AI/ML engine comprises (i) a parametric feature extraction module and (ii) an Artificial Neural Network (ANN) module configured to classify insurance claims as valid or invalid, and wherein the functions further comprise:

maintaining an auto-correlation matrix for the parametric feature extraction module of the AI/ML Engine, wherein individual entries in the auto-correlation matrix quantify how often diagnosis codes appear together within individual valid insurance claims of a set of valid insurance claims;

maintaining a plurality of latent space matrices based on an association matrix for the parametric feature extraction module of the AI/ML Engine, wherein individual entries in the association matrix quantify how often diagnosis codes and procedure codes appear together within individual valid insurance claims of the set of valid insurance claims;

using the auto-correlation matrix and the latent space matrices to generate feature vectors based on the training dataset; and wherein using the training dataset to train the AI/ML Engine to classify insurance claims as valid or invalid comprises using the generated feature vectors to train the ANN module of the AI/ML Engine.

* * * * *